United States Patent
Zhang et al.

(10) Patent No.: US 12,001,120 B1
(45) Date of Patent: Jun. 4, 2024

(54) BURIED BACK REFLECTOR

(71) Applicant: HyperLight Corporation, Cambridge, MA (US)

(72) Inventors: Mian Zhang, Cambridge, MA (US); Kevin Luke, Cambridge, MA (US); Prashanta Kharel, Cambridge, MA (US); Christian Reimer, Wellesley, MA (US); Lingyan He, Brookline, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 17/556,323

(22) Filed: Dec. 20, 2021

Related U.S. Application Data

(60) Provisional application No. 63/128,664, filed on Dec. 21, 2020.

(51) Int. Cl.
*G02F 1/313* (2006.01)
(52) U.S. Cl.
CPC ........ *G02F 1/313* (2013.01); *G02F 2201/302* (2013.01); *G02F 2201/34* (2013.01); *G02F 2202/101* (2013.01); *G02F 2202/20* (2013.01)
(58) Field of Classification Search
CPC ................................................ G02F 2201/302
See application file for complete search history.

(56) References Cited

U.S. PATENT DOCUMENTS

| | | | | |
|---|---|---|---|---|
| 10,295,741 | B2 * | 5/2019 | Melikyan | G02B 6/30 |
| 11,531,171 | B2 * | 12/2022 | Menezo | G02B 6/4206 |
| 2003/0053731 | A1 * | 3/2003 | Bhowmik | G02F 1/01 |
| | | | | 385/14 |
| 2016/0246009 | A1 * | 8/2016 | Jiang | G02B 6/124 |

* cited by examiner

*Primary Examiner* — Rhonda S Peace
(74) *Attorney, Agent, or Firm* — Van Pelt, Yi & James LLP

(57) ABSTRACT

An optical device including a plurality of electrodes, an electro-optic component, an optical grating, and a buried back reflector is described. The electro-optic component includes at least one optical material exhibiting an electro-optic effect. The optical grating is optically coupled with the electro-optic component. In some embodiments, the optical grating includes a vertical optical grating coupler. The buried back reflector is optically coupled with the optical grating. The buried back reflector is configured to increase a coupling efficiency of the optical grating to an out-of-plane optical mode and configured to reduce a performance perturbation to the plurality of electrodes. The buried back reflector may include a metal layer having a thickness of at least thirty nanometers and not more than five hundred nanometers.

6 Claims, 13 Drawing Sheets

BURIED BACK REFLECTOR

CROSS REFERENCE TO OTHER APPLICATIONS

This application claims priority to U.S. Provisional Patent Application No. 63/128,664 entitled BURIED BACK REFLECTOR filed Dec. 21, 2020 which is incorporated herein by reference for all purposes.

BACKGROUND OF THE INVENTION

Thin-film electro-optic material (e.g. lithium niobate and lithium tantalate) platforms support low loss passive optical devices and active electro-optic devices. Tight confinement of the optical mode in such thin film electro-optic devices allows for enhanced electro-optic performance as well as dense photonic integration. To couple light into and out of the photonic integrated circuit containing such electro-optic devices, the tightly confined waveguide optical mode is matched to an optical fiber at the edge of the photonic integrated circuit. However, the optical fiber may be an order of magnitude (or more) larger in diameter than the waveguide optical mode. Consequently, coupling the electro-optic devices to the optical fiber is challenging. Various vertical coupling strategies that use grating couplers have been explored in various photonic platforms. Such grating couplers may not suffer from size mismatch issues that occur for optical fibers. Further, grating couplers may be fabricated relatively easily because grating couplers can be formed in the same etching step used to define optical waveguides. However, such grating couplers may suffer from optical losses that make their use unacceptable. Accordingly, what is desired is an improved mechanism for coupling light to and from an electro-optic device.

BRIEF DESCRIPTION OF THE DRAWINGS

Various embodiments of the invention are disclosed in the following detailed description and the accompanying drawings.

DETAILED DESCRIPTION

Figure 1A:
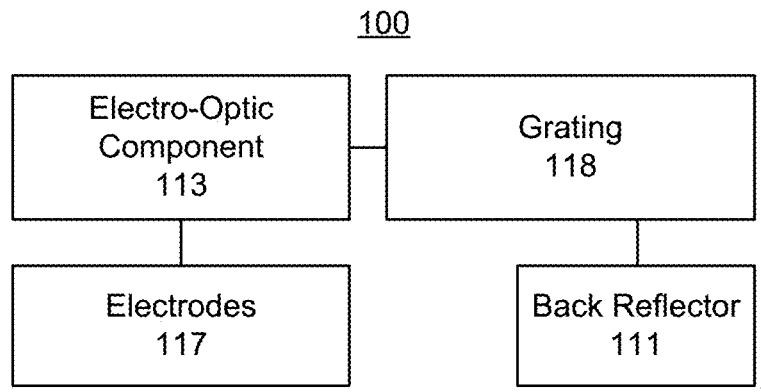
FIGS. 1A-1C are diagrams illustrating an embodiment of an electro-optic device using a buried back reflector.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Thin-film electro-optic material such as lithium niobate (LN) and lithium titanate (LT) may be used to fabricate low loss passive and active electro-optic devices. Such electro-optic devices provide tight confinement of the optical mode, which may result in enhanced electro-optic performance and dense photonic integration. However, such tightly confined optical modes are significantly smaller than optical fibers to which such modes might be directly coupled at an edge of a photonic integrated circuit. For example, the mode field diameter in a waveguide of an LN or LT electro-optic device is on the order of 1.1 µm-1.3 µm (e.g. approximately 1.2 µm). In contrast, optical fibers are typically on the order of ten micrometers in diameter. This mismatch may make alignment and low-loss coupling between the fiber and electro-optic device difficult to achieve.

Various vertical grating couplers have been explored in some photonic platforms. Such grating couplers may not suffer from size mismatch issues that occur for optical fibers and may be fabricated relatively easily. The grating couplers are usually formed in the layer of electro-optic materials in which the waveguide and other optical components of the device are formed. In order to reduce optical losses, a buried back reflector might be used to the recover at least some of the downward diffracted light, which would otherwise be lost into the underlying substrate. Traditionally, the wafer used in forming such a device has a uniform layer of metal (i.e. the reflector) across the surface of the entire wafer. The metal layer is covered (i.e. buried) under a bottom cladding layer. Front end processing (such as various lithography steps, etching and metal evaporation) defines the gratings for coupling light into and out of the devices, the waveguides to route optical signals, and the electrodes to impart electro-optic phase modulation. This processing is typically carried out on and above the bottom cladding layer.

Although such optical devices have reduced optical losses at the grating, other issues adversely affect performance. The buried back reflector is typically only a few micrometers below the electro-optic layer in which optical components, such as waveguides, are formed. The buried back reflector is also typically in close proximity to the electrodes used to energize the electro-optic effect. The presence of the buried back reflector leads to detrimental changes in the microwave (radio frequency, or RF) properties. For example, the RF index, losses, and impedance of the electrodes may change. These changes in one or more of the RF properties of the electrodes may dramatically reduce the electro-optic performance of the modulators in thin-film LN and/or LT. This is because even at the GHz frequency range for the electrode signal in which many electro-optic devices operate, the microwave mode is generally about two orders of magnitude bigger than the tightly confined optical mode. The microwave mode for the electrode (microwave) signals carried by the electrodes thus extends into the region of the buried back reflector, while the optical mode does not. Thus, performance of the conventional device using the grating coupler is adversely affected.

An optical device including a plurality of electrodes, an electro-optic component, an optical grating, and a buried back reflector is described. The electro-optic component includes at least one optical material exhibiting an electro-optic effect. The optical grating is optically coupled with the electro-optic component. In some embodiments, the optical grating includes a vertical optical grating coupler. The buried back reflector is optically coupled with the optical grating. The buried back reflector is configured to increase a coupling efficiency of the optical grating to an out-of-plane optical mode and configured to reduce a performance perturbation to the plurality of electrodes. The buried back reflector may include a metal layer having a thickness of at least thirty nanometers and not more than five hundred nanometers.

In some embodiment, the optical device also includes a substrate. The electro-optic component, the optical grating, and the buried back reflector are on the substrate. A portion of the substrate is aligned with the optical grating and is continuous. In some embodiments, a distance between a top surface of the buried back reflector and a bottom surface of the optical grating is separately tailored from a thickness of the buried back reflector. In some such embodiments, the substrate has a depression therein. The buried back reflector is in the depression. In some such embodiments, the substrate has a raised portion. The buried back reflector is on the raised portion. In some embodiments, a portion of the electro-optic component is between the electrodes. The buried back reflector is offset from the portion of the electro-optic component. In some embodiments, the buried back reflector is offset from the plurality of electrodes.

An optical modulator including electrodes, a waveguide, an optical grating and a buried back reflector is described. The waveguide includes at least one optical material exhibiting an electro-optic effect. A portion of the waveguide is between the electrodes. The optical grating is optically coupled with the waveguide. The buried back reflector is optically coupled with the optical grating, configured to increase a coupling efficiency of the optical grating to an out-of-plane optical mode, and configured to reduce a performance perturbation to the plurality of electrodes.

A method for providing an optical device is described. The method includes providing a plurality of electrodes and providing an electro-optic component including at least one optical material exhibiting an electro-optic effect. The method also includes providing an optical grating optically coupled with the electro-optic component. A buried back reflector optically coupled with the optical grating is also provided. The buried back reflector is configured to increase a coupling efficiency of the optical grating to an out-of-plane optical mode and to reduce a performance perturbation to the plurality of electrodes.

In some embodiments, providing the buried back reflector further includes providing an adhesion layer and providing a metal layer on the adhesion layer. The metal layer has a thickness of at least thirty nanometers and not more than five hundred nanometers.

In some embodiments, the optical device is fabricated on a substrate. Thus, the electro-optic component, the optical grating and the buried back reflector reside on the substrate. A portion of the substrate aligned with the optical grating is continuous. Thus, in some such embodiments, the buried back reflector is formed before the electro-optic component and before the electrodes. In some embodiments, a distance between a top surface of the buried back reflector and a bottom surface of the optical grating is separately tailored from a thickness of the buried back reflector. For example, the buried back reflector may be provided by forming a depression in the substrate and forming the buried back reflector in the substrate. The buried back reflector may also be fabricated by etching regions of the substrate away from the buried back reflector such that the buried back reflector is on a raised portion of the substrate. In some embodiments, a portion of the electro-optic component is between the electrodes. The buried back reflector is offset from the portion of the electro-optic component. In some embodiments, the buried back reflector is offset from the electrodes.

Figure 1B:
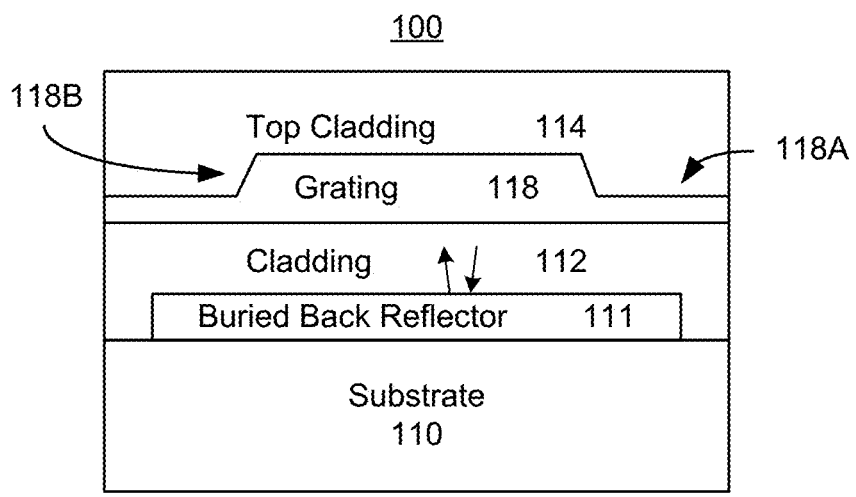
Figure 1C:
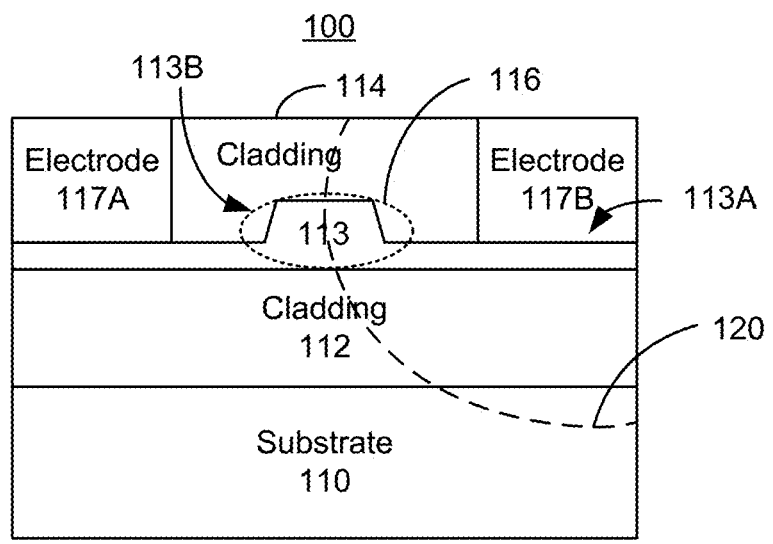

FIGS. 1A-1C are diagrams illustrating an embodiment of electro-optic device 100 including a buried back reflector. FIG. 1A depicts a block diagram of electro-optic device 100. FIGS. 1B and 1C are cross-sectional views of electro-optic device 100. For clarity, only some portions of electro-optic device are shown. FIGS. 1B-1C are not to scale. In some embodiments, electro-optic device 100 may include other and/or additional components. Electro-optic device 100 includes substrate 110, back reflector 111, bottom cladding (also termed buried oxide in some cases) 112, electro-optic component 113, top cladding 114, electrodes 117A and 117B (collectively or generically electrodes 117), and grating 118. Although only a particular number of components are shown, electro-optic device may include another number. For example, multiple buried back reflectors 111, another number of electrodes 117, and/or multiple electro-optic components 113 (or structures therein) may be present.

Substrate 110 may include a semiconductor or dielectric substrate such as silicon, quartz, fused silica, sapphire. Substrate 110 may include a high microwave dielectric constant layer (not separately indicated) on a lower microwave dielectric constant layer (not separately indicated). For example, the high microwave dielectric constant layer may be silicon dioxide, while low dielectric constant layer may be silicon. Other substrates and/or underlayers, including a single layer substrate, may be used in some embodiments. Further, in the embodiment shown, the underlying portion of substrate 110 on which all subsequent structures are fabricated, such as a silicon wafer, is continuous at least in the region of buried back reflector 111. Stated differently, the portion of substrate 110 that is aligned with buried back reflector 111 and/or optical grating 118 is continuous. In the embodiment shown, therefore, buried back reflector 111 is not formed using backside processing of the underlying portion of substrate 110. For example, buried back reflector 111 is not formed by etching substrate 111 from the back side after cladding 112, electro-optic component 113, grating 118 and cladding 114 have been fabricated. Instead, buried back reflector 111 is formed before cladding 111, electro-optic component 113, grating 118 and cladding 114. In some embodiments, the entire underlying portion of substrate 110 is continuous. In such embodiments, no backside etching may be used. In other embodiments, backside processing may be used for other structures (not shown) and/or buried back reflector 111.

Electro-optic component 113 includes one or more electro-optic materials and is a thin film electro-optic component. As used herein, an electro-optic material exhibits the electro-optic effect and may have an effect that is at least (e.g. greater than or equal to) 5 picometer/volt. In some embodiments, the electro-optic material has an effect that is at least 10 picometer/volt. In some such embodiments electro-optic material has an effect of at least 20 picometer/volt. The electro-optic material experiences a change in index of refraction in response to an applied electric field. In some embodiments, the electro-optic material is ferroelectric. In some embodiments, the electro-optic material effect includes a change in index of refraction in an applied electric field due to the Pockels effect. Thus, in some embodiments, electro-optic materials possessing the electro-optic effect in one or more the ranges described herein are considered electro-optic materials regardless of whether the effect is linearly or nonlinearly dependent on the applied electric field. The electro-optic material may be a non-centrosymmetric material. Therefore, the electro-optic material may be piezoelectric. In some embodiments, the electro-optic material(s) include one or more of lithium niobate (LN), lithium tantalate (LT), potassium niobate, gallium arsenide, potassium titanyl phosphate, lead zirconate titanate, and barium titanate. In other embodiments, other electro-optic materials having analogous optical characteristics may be used.

In the embodiment shown, electro-optic component 113 includes a ridge waveguide. Thus, slab 113A and ridge 113B are indicated. Further, slab 113A and ridge 113B are thin film optical components in some embodiments. Ridge 113B may thus be at least one hundred nanometers and not more than one thousand nanometers high. In some embodiments, ridge 113B is at least two hundred nanometers and not more than six hundred nanometers high. For example, ridge 113B may have a height of not more than four hundred nanometers. In some embodiments, ridge 113B has a height of not more than three hundred nanometers. In some embodiments, slab 113A has a height of not more than hundred nanometers in electro-optic component 113. In some embodiments, slab 113A has a height of at least one hundred nanometers and not more than two hundred nanometers. The width of ridge 113B is configured to confine the desired mode of the optical signal in electro-optic component 113. For example, ridge 113B may not more than two micrometers wide in some embodiments. Slab 113A is shown as having a width such that slab 113A extends beyond (farther from and closer to electro-optic component 113) than electrodes 117. Other widths and/or heights are possible. For example, slab 113A may extend only to electrodes 117.

Although only ridge 113B and slab 113A are shown, electro-optic component 113 may include other and/or additional passive and/or active components. Similarly, electro-optic component 113 may have another configuration. For example, at least in the region distal from electrodes 117, electro-optic component 113 may be a channel waveguide (i.e. slab 113A may be omitted). Electro-optic device 113 may also be configured such that optical mode 116 (depicted by dotted lines in FIG. 1C) is well contained. Optical mode 116 may be a single mode or a multimode. Thus, in the embodiment shown, optical mode 116 does not extend significantly beyond ridge 113B. For example, in some embodiments, optical mode 116 has a diameter on the order of 1.1 μm-1.3 μm (e.g. approximately 1.2 μm).

Electrodes 117 are used to carry an electrical signal (electrode signal). Electrodes 117 may be metal electrodes, for example including aluminum, gold, silver, titanium, chromium, and/or copper. Other types of electrodes may be used in other embodiments. The electrode signal typically has frequencies in the microwave range. When energized, electrodes 117 cause the electro-optic material of electro-optic component 113 to modulate the optical carried by electro-optic component. The electrode signal has an associated microwave mode 120. For simplicity, only microwave mode 120 for electrode 117B is shown. Microwave mode 120 generally extends well beyond the edges of electrodes 117 (i.e. is not well contained by electrodes 117). For example, microwave mode 120 extends well into cladding 112 and 114, substrate 110, and ridge 113B.

Cladding 112 and 114 may include optical materials having an index of refraction which may improve the confinement of optical mode 116. In some embodiments, bottom cladding 112 and/or top cladding 114 has an index of refraction less than that of the electro-optic material(s) used for electro-optic device 100B. In some embodiments, cladding 112 may include one or more of silicon dioxide, aluminum oxide, silicon oxynitride, benzocyclobutene (BCB), and SU-8. For example, bottom cladding 112 and/or top cladding 114 may include silicon dioxide. In some embodiments, cladding 112 and/or 114 may include multiple material(s) and/or multiple layers. In some embodiments, the thickness of bottom cladding 112 is at least 0.3 multiplied by the wavelength of light being guided divided by the optical refractive index of the ridge 113B. In some embodiments, the thickness of bottom cladding 112 is at least 0.5 multiplied by the wavelength of light being guided divided by the optical refractive index of the ridge 113B. In some embodiments, the thickness of bottom cladding 112 is at least 1 multiplied by the wavelength of light being guided divided by the optical refractive index of the ridge 113B. In some embodiments, the thickness of bottom cladding 112 is at least 2 multiplied by the wavelength of light being guided divided by the optical refractive index of the ridge 113B. In some embodiments, the thickness of bottom cladding 112 is at least 10 multiplied by the wavelength of light being guided divided by the optical refractive index of the ridge 113B.

Optical grating 118 is optically coupled with electro-optic component 113. In some embodiments, optical grating 118 is made from the same electro-optic material(s) as electro-optic component 113. For example, both optical grating 118 and electro-optic component 113 may be fabricated (e.g. via lithography) from the same electro-optic materials. In some embodiments, optical grating 118 may be fabricated from other optical materials. In some embodiments, optical grating 118 is a vertical optical grating coupler. Optical grating 118 may be of a variety of grating types. For example, optical grating 118 may be or include one-dimensional, two-dimensional, three-dimensional, photonic crystal, uniform, apodized, chirped, aperiodic, and/or multi-layer grating(s). Optical grating 118 may include a series of ridges 118B (of which only one is shown in the cross-sectional view of FIG. 1B) and slab 118A. In some embodiments, slab 118A is connected to (e.g. part of the same slab as) slab 113A.

Optical grating 118 is used to couple the optical signal out to a fiber (not shown in FIGS. 1A-1C). Such an optical fiber may be a single mode fiber, a multimode fiber, an ultra-high NA fiber, a photonic crystal fiber, a hollow core fiber, a polarization maintaining fiber, a multicore fiber, a graded index fiber, and/or another type of fiber. The optical mode of the fiber may be a single mode or a multimode. In other embodiments, other materials, types of fibers, grating types, and/or modes may be used.

Buried back reflector 111 is optically coupled with optical grating 118. In some embodiments, buried back reflector 111 extends at least under the entirety of optical grating 118. In other embodiments, buried back reflector 111 extends under only a portion of optical grating 118. However, even if buried back reflector 111 extends only under a portion of optical grating 118, at least some of the energy reflected downward is recaptured and performance improved. Buried back reflector 111 may include one or more metal layers, such as gold, that is sufficiently thick to reflect the portion of the optical signal (e.g. light) from optical grating 118 that is incident upon buried back reflector 111. In some embodiments, buried back reflector 111 includes one or more layers of at least one of gold, aluminum, chromium, titanium, platinum, silver, copper, silicon dioxide, amorphous silicon and titanium dioxide. Thus, buried back reflector 111 may include multiple back reflector layers (metal or dielectric), stacks (such as titanium, chromium, aluminum, gold, titanium dioxide, silicon dioxide, and amorphous silicon), and/or other components. For example, buried back reflector 111 may include or consist of a gold layer having a thickness of at least thirty nanometers. Further, buried back reflector 111 is sufficiently thin that subsequent processing is not significantly adversely affected. For example, a planarization such as chemical mechanical planarization (CMP) of cladding 112 may still provide a sufficiently smooth surface for fabrication of the electro-optic material(s) used for optical grating 118 and/or electro-optic device 113. For example, buried back reflector 111 may include or consist of a gold layer having a thickness of not more than five hundred nanometers. In some embodiments, the gold layer has a thickness of not more than two hundred nanometers. In some embodiments, the thickness of the gold layer is not more than one hundred nanometers. In some embodiments, buried back reflector 111 also includes an adhesion layer (not explicitly shown in FIG. 1B), such as Ti or Cr. For example, a gold layer described above may be deposited on a Ti adhesion layer having a thickness of nominally at least five nanometers and not more than ten nanometers. Such an adhesion layer improves the ability of buried back reflector 111 to adhere to substrate 110.

Buried back reflector 111 is configured to increase a coupling efficiency of optical grating 118 to an out-of-plane optical mode and configured to reduce a performance perturbation to electrodes 117. More specifically, buried back reflector 111 reflects portions of the optical signal traveling downward from optical grating 118 back toward optical grating 118. This is shown by the unlabeled arrows in FIG. 1B. Thus, buried back reflector 111 is at least under optical grating 118. If buried back reflector 111 were omitted, this portion of the optical signal would be lost. Consequently, buried back reflector 111 improves the coupling efficiency of optical grating 118.

Buried back reflector 111 improves this coupling efficiency without introducing undue interference with operation of electro-optic component 113. More specifically, the location and geometry of buried back reflector 111 is such that buried back reflector does not significantly adversely affect performance of the electrodes 117. As a result, the coupling between electrodes 117 and electro-optic component 113 is not significantly adversely affected. Buried back reflector 111 thus does not unduly interfere with microwave mode 120 of the electrode signal(s) that is carried by electrodes 117 and used to modulate the optical signal carried by electro-optic component 113. If in proximity to electrodes 117 (and/or the microwave mode 120 for the electrode signals carried) and electro-optic component 113, the reflective properties of buried back reflector 111 could affect the microwave mode 120 and coupling between electrodes 117 and electro-optic component 113. In some embodiments, therefore, buried back reflector 111 does not extend into the region where microwave mode 120 and optical mode 113 overlap (or the portion of electro-optic device 100 below such a region). In some embodiments, buried back reflector 111 does not extend under electro-optic component 113 (i.e. ridge 113B which confines the optical mode 116) that is between electrodes 117. Thus, buried back reflector 111 may be considered offset from electro-optic component 113. In some embodiments, buried back reflector 111 does not extend into the region between electrodes 117 where microwave mode 120 exists. In some embodiments, buried back reflector 111 does not extend into the region of cladding 112 that is between electrodes 117. In some embodiments, buried back reflector 111 also does not extend into the region of cladding 112 below electrodes 117. Stated differently, buried back reflector 111 is offset from electrodes 117. However, in some embodiments, buried back reflector 111 might extend into a small portion of cladding 112 near the outer edges of electrodes 117 (i.e. away from ridge 113) and below electrodes 117. In some embodiments, buried back reflector 111 is under optical grating 118 but does not extend under any other optical structures that are fabricated and carry an optical signal (e.g. a portion of electro-optic component 113/ridge 113B outside of electrodes 117).

For example, buried back reflector 111 maybe be positioned far enough from the metal gap between the transmission line electrodes 117A and 117B that there is a negligible change in microwave properties of the transmission line 117. In some embodiments, the buried back reflector 111 is at least a distance that is 0.1 multiplied by the metal gap (between the transmission line electrodes 117A and 117B) from the center of the transmission line 117B. In some embodiments, buried back reflector 111 is at least a distance that is 0.5 times the metal gap (between the transmission line electrodes 117A and 117B) from the center of the transmission line 117B. In some embodiments, buried back reflector 111 is at least a distance that is 1 multiplied by the metal gap (between the transmission line electrodes 117A and 117B) from the center of the transmission line 117B. In some embodiments, buried back reflector 111 is at least a distance that is 5 multiplied by the metal gap (between the transmission line electrodes 117A and 117B) from the center of the transmission line 117B. In some embodiments, each buried back reflector 111 is at least a distance that is 10 multiplied by the metal gap (between the transmission line electrodes 117A and 117B) from the center of the transmission line 117B. In some embodiments, buried back reflector 111 is at least a distance that is 100 multiplied by the metal gap (between the transmission line electrodes 117A and 117B) from the center of the transmission line 117B. In some embodiments, other distances may be used. Further, other buried back reflector(s) (not shown) might be a different distance from electrodes 117.

Electro-optic device 100 may have improved performance. A vertical grating coupler 118 with a buried back reflector 111 that does not substantially adversely affect the properties of the microwave electrodes 1117 is defined. Optical grating coupler 118 facilitates input and output of light through the device. In some embodiments, optical grating coupler 118 is lithographically defined on an electro-optic material such as LN and/or LT. Because electro-optic materials such as LN and/or LT may be used for electro-optic component 113, a larger modulation at a lower amplitude voltage for the electrode signal may be achieved. Further, thin film processing techniques, such as deep ultraviolet lithography, may be used to fabricate electro-optic component 113 as well as optical grating 118. Coupling efficiency of electro-optic device 100 may also be improved. Use of optical coupler 118, for example in lieu of directly coupling to an optical fiber at an edge of the photonic integrated circuit including electric-optic device 100, improves the optical coupling efficiency. This optical coupling efficiency is further enhanced by the use of back reflector 111. In addition, because back reflector 111 is configured to mitigate interference with the microwave signal carried by electrodes 117 and/or the coupling between electrodes 117 and electro-optic device 113, the perturbation to the performance of electrodes 117 may be reduced. Optical and microwave performance may be separately optimized. Further, substrate 110 may be continuous below buried back reflector 111. Thus, mechanical robustness of electro-optic device 100 may be improved. Consequently, performance and reliability of electro-optic device 100 may be enhanced.

Figure 2A:
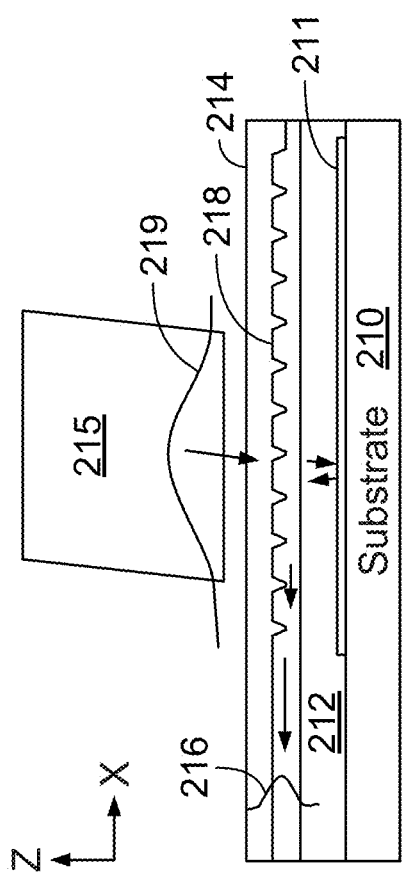
FIGS. 2A-2C are diagrams illustrating an embodiment of an optical modulator using a buried back reflector.
Figure 2B:
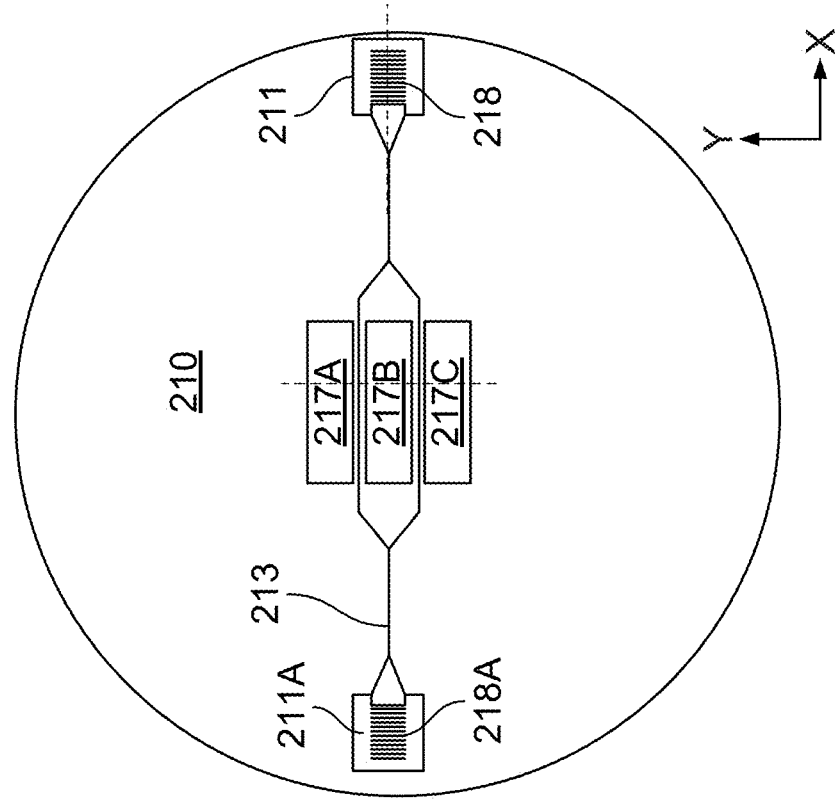
Figure 2C:
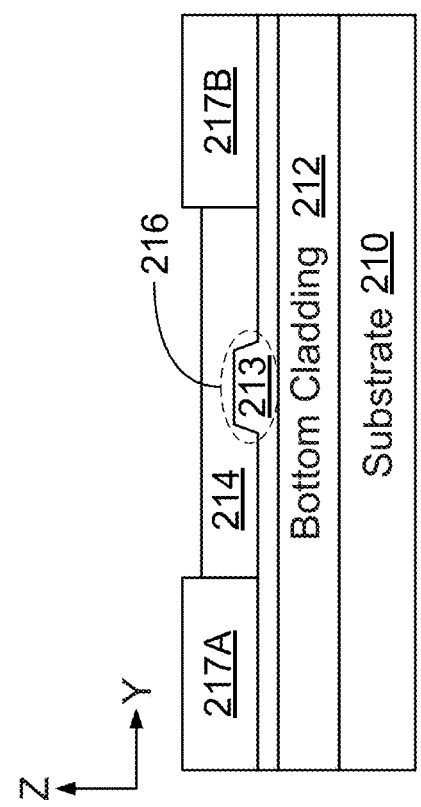

FIGS. 2A-2C are diagrams illustrating an embodiment of electro-optic device 200 using a buried back reflector. FIGS. 2A-2C are not to scale. Electro-optic device 200 is analogous to electro-optic device 100. Thus, electro-optic device 200 includes substrate 210, buried back reflector 211, bottom cladding 212, optical modulator (also termed a waveguide) 213 including a slab and a ridge, top cladding 214, electrodes 217A, 217B, and 217C (collectively or generically 217) and optical grating 218 that are analogous to substrate 110, buried back reflector 111, bottom cladding 112, electro-optic component 113 including slab 113A and ridge 113B, top cladding 114, electrodes 117, and optical grating 118, respectively. Consequently, the structure (e.g. materials used for and layer(s) therein), geometry, and function of these components are analogous. For example, optical grating 218 may be formed of the same electro-optic materials as optical modulator/waveguide 213. FIG. 2A depicts a side view of electro-optic device 200 in the region of optical grating 218. Also shown in FIG. 2A is optical fiber 215 from which an optical signal is desired to be coupled via optical grating 218. Optical grating 218 may also be used to couple optical signals out to fiber 215. FIG. 2C depicts a cross-sectional view of electro-optic device 200 in the region of electrodes 217A and 217B (e.g. depicting one ridge waveguide 213). FIG. 2B depicts a top view of electro-optic device 200 as fabricated on substrate 210. Also shown in FIG. 2B are an additional grating 218A and an additional back reflector 211A that are analogous to optical grating 218 and buried back reflector 211. The dashed lines in FIG. 2B indicate the locations of FIG. 2A and FIG. 2C. In general, multiple other optical modulators (not shown) and/or other components are fabricated on substrate 210. For clarity, only some portions of electro-optic device 200 are shown. In some embodiments, electro-optic device 200 may include other and/or additional components.

Electro-optic device 200 includes substrate 210, buried back reflector 211 (which may include one or more metal layers), bottom cladding 212, waveguide 213, top cladding 214, the optical fiber 215, metal electrodes 217, and optical grating 218. Also shown are the extent of the optical mode 216 in optical grating 218 and fiber mode 219. In some embodiments, substrate 210 is a semiconductor or dielectric substrate such as silicon, quartz, fused silica, sapphire. Buried back reflector 211 may include one or more layers of at least one of gold, aluminum, chromium, titanium, platinum, silver, copper, silicon dioxide, amorphous silicon and titanium dioxide. Thus, buried back reflector 211 may include multiple back reflector layers (metal or dielectric), stacks (such as titanium, chromium, aluminum, gold, Titanium dioxide, silicon dioxide, and amorphous silicon), and/or other components.

Bottom cladding 212 may include one or more of silicon dioxide, aluminum oxide, silicon oxynitride, benzocyclobutene (BCB), and SU-8. Waveguide/optical modulator 213 is an optical guiding region and may include one or more of lithium niobate, lithium tantalate, and gallium arsenide. In some embodiments, the electro-optic material having the largest electro-optic effect in waveguide 213 has an electro-optic effect of at least 5 pm/V. In some embodiments, the electro-optic material having the largest electro-optic effect used in waveguide has an electro-optic effect of at least 210 pm/V. In some embodiments, the electro-optic material having the largest electro-optic effect used in waveguide has an electro-optic effect of at least 20 pm/V. Cladding 212 and 214 may include one or more of silicon dioxide, aluminum oxide, silicon oxynitride, benzocyclobutene (BCB), SU-8, and a doped glass. Optical mode 216 may be a single mode or a multimode. Optical fiber 215 may be a single mode fiber, a multimode fiber, an ultra-high NA fiber, a photonic crystal fiber, a hollow core fiber, a polarization maintaining fiber, a multicore fiber, and/or a graded index fiber. Electrodes 217 may be metal electrodes, for example including aluminum, gold, silver, titanium, chromium, and/or copper. Optical grating 218 may be of a variety of grating types. For example, optical grating 218 may be 1-dimensional, 2-dimensional, 3-dimensional, photonic crystal, uniform, apodized, chirped, aperiodic, and/or multi-layer. Fiber mode 19 may be a single mode or a multimode. In other embodiments, other materials, types of fibers, electrodes, grating types and/or modes may be used.

In some embodiments, buried back reflector 211 resides only in regions distal from electrodes 217. In the embodiment shown, buried back reflector 211 is proximate to grating 218. In some embodiments, buried back reflector 211 extends at least under the entirety of optical grating 218. However, even if buried back reflector 211 extends only under a portion of optical grating 218, at least some of the energy reflected downward is recaptured and performance improved. In some embodiments, the lateral dimensions of buried back reflector 211 are at least 0.1 multiplied by the mode field diameter of the fiber mode 219 and located under optical grating 218. In some embodiments, the lateral dimensions of buried back reflector 211 are at least 0.5 multiplied by the mode field diameter of the fiber mode 219 and located under optical grating 218. In some embodiments, the lateral dimensions of buried back reflector 211 are at least one multiplied by the mode field diameter of the fiber mode 219 and located under optical grating 218. In some embodiments, the lateral dimensions of buried back reflector 211 are at least two multiplied by the mode field diameter of the fiber mode 219 and located under optical grating 218. In some embodiments, the lateral dimensions of buried back reflector 211 are at least ten multiplied by the mode field diameter of the fiber mode 219 and located under optical grating 218.

FIG. 2A shows pre-patterning of the buried back reflector 211 on substrate 210 as a part of the front-end processing. Thus, buried back reflector 211 may be formed before bottom cladding 212, the electro-optic materials for optical modulator 213 and/or optical gratings 218 and 218A, and top cladding 214. As a result, substrate 210 is continuous under buried back reflector 211 and optical grating 218. Pre-patterning of buried back reflector 211 and 211A is followed by deposition of the buried cladding layer 212, planarization of cladding 212, and bonding of the electro-optic material 213. Once the back-end processing is complete, front-end processing is used to realize vertical grating couplers 218 that are positioned above the buried back reflector 211. The embodiment shown in FIG. 2C does not have buried back reflector 211 underneath the microwave electrodes 217 because buried back reflector 211 has been pre-patterned. However, in other embodiments, some portion of back reflector may extend under electrodes 217. For example, buried back reflector 211 might have portions (not shown in FIGS. 2A-2C) that reside under the transmission line 217, including the labeled portion of the electrodes 217 shown in FIGS. 2A-2C. However, in such embodiments, the buried back reflector 211 is geometrically adapted to reduce or minimize performance impacts to microwave electrodes 217. For example, only a small portion of such a buried back reflector might extend under the outer edges of electrode(s) 217. Although a rectangular shape for the pre-patterned buried back reflector layer 211 is shown in FIG. 2B, other shapes including but not limited to trapezoidal, semicircular, triangular, and/or other shapes that back reflects the light may be used. The embodiment shown in FIGS. 2A and 2B utilizes a particular periodic 1-dimensional grating design of optical gratings 218 and 218A. However, other embodiments with linear, aperiodic, chirped, photonic crystal, 2-dimensional and/or other grating designs may be used.

In some embodiments, the pre-patterning of the buried back reflector 211 on substrate maybe accomplished by back reflector deposition (such as e-plating, evaporation, and sputtering to name a few), lithography, and liftoff. For example, substrate 210 may not have a metal layer incorporated therein. In such embodiments, the metal (and/or other constituents) of buried back reflector 211 may be deposited and processed as described above. In some embodiments, the pre-patterning of the buried back reflector 211 on substrate maybe achieved by back reflector deposition (such as e-plating, evaporation and sputtering to name a few), lithography, and wet/dry etching of the metal.

In some embodiments, substrate 210 underneath the back reflector maybe removed. Thus, an air or other gap may reside below the electrodes 217 and/or other desired structures in the optical device. In some embodiments, the buried back reflector material such as gold maybe chosen to minimize light absorption in the buried back reflector 211 itself. In some embodiments, the layer(s) for the buried back reflector 211 maybe deposited far enough from the grating layer 218 to reduce optical absorption of the waveguide mode 216 due to metal.

In some embodiments, the buried back reflector 211 (and 211A) maybe be positioned far enough from the metal gap (i.e., between the transmission line electrodes 217A and 217B) that there is a negligible change in microwave properties of the transmission line 217. Thus, the structure, geometry (e.g. size, thickness, and/or shape), and location(s) of buried back reflector 211 and 211A may be analogous to those of buried back reflector 111. Further, each buried back reflector 211 and 211A might be a different distance from electrodes 217.

In some embodiments, the buried back reflector layer 211 is placed at some distance below the electro-optic material(s) for waveguide 213 and optical grating 218. This distance may be proportional to the wavelength of light divided by the optical index. Thus, constructive interference of back reflected light into the optical waveguide 213 may cause enhanced coupling of light into the waveguide. Some possible distances are discussed above with respect to electro-optic device 100.

In some embodiments, buried back reflector 211 is patterned across the wafer to reduce the coupling loss of grating couplers without dramatically altering microwave properties of the transmission. In the embodiment shown in FIGS. 2A-2C, this is accomplished by removing portions of a metal layer, leaving the buried back reflector 211 shown. In other embodiments, other patterning not including complete removal of portions of the metal layer may be used. However, in some embodiments, precise fine tuning of microwave properties (such as index, loss and impedance) with buried back reflector layer 211 is also possible.

In some embodiments, the buried back reflector 211 is patterned in (e.g. occupies) less than 75% of the wafer area. In some embodiments, the buried back reflector 211 is patterned in less than 25% of the wafer area. In some embodiments, the buried back reflector 211 is patterned in less than 10% of the wafer area. In some embodiments, the buried back reflector 211 is patterned in less than 5% of the wafer area. In these embodiments, the density of the buried back reflector 211 pattern may vary across the wafer.

In some embodiments, the substrate 210 maybe be etched before pattering the buried back reflector 211 in the etched trenches. This embodiment permits independent optimization of microwave electrodes and the vertical grating coupler.

In some embodiments, the substrate 210 maybe etched after pattering the buried back reflector 211. This embodiment permits independent optimization of microwave transmission line and the vertical grating coupler.

Electro-optic device 200 may share the benefits of electro-optic device 100. Use of buried back reflectors 211 and/or 211A may increase coupling efficiency of optical grating(s) 218 and/or 218A to an out-of-plane optical mode. Because of the configuration of the buried back reflectors 211 and/or 211A, operation of electrodes 217 may not be compromised. Further, the optical and microwave performance may be separately optimized. Thus, the optical and microwave performance of electro-optic device 200 may be improved.

Figure 3A:
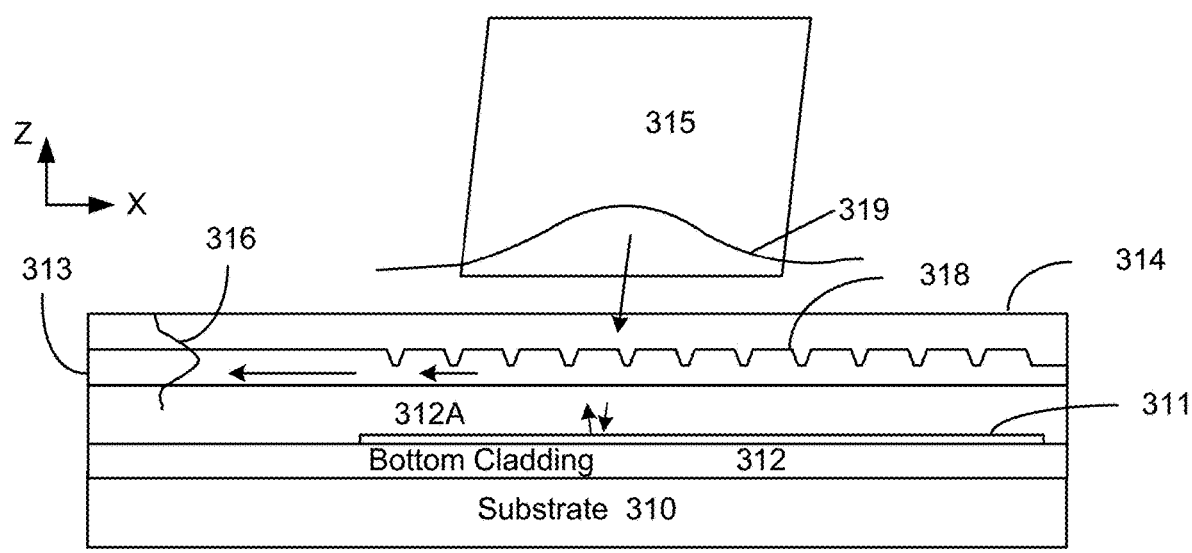
FIGS. 3A-3B are diagrams illustrating an embodiment of an electro-optic device using a buried back reflector.
Figure 3B:
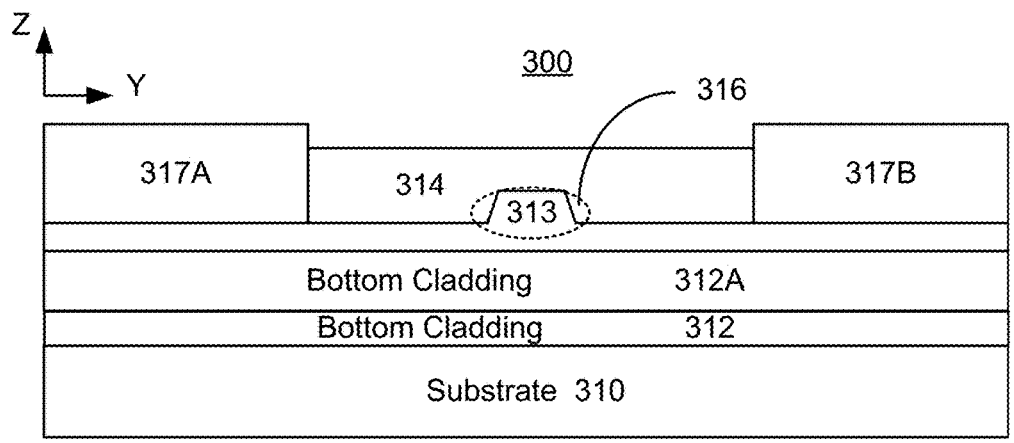

FIGS. 3A-3B are diagrams illustrating an embodiment of electro-optic device 300 using a buried back reflector. FIGS. 3A-3B are not to scale. Electro-optic device 300 is analogous to electro-optic device(s) 100 and/or 200. Thus, electro-optic device 300 includes substrate 310, buried back reflector 311, bottom cladding 312 and 312A, electro-optic component 313 including a slab and a ridge, top cladding 314, electrodes 317A and 317B (collectively or generically 317) and optical grating 318 that are analogous to substrate 110 and/or 210, buried back reflector 111 and/or 211, bottom cladding 112 and/or 212, electro-optic component 113 including slab 113A and ridge 113B and/or 213, top cladding 114 and/or 214, electrodes 117 and/or 217, and optical grating 118 and/or 218, respectively. Consequently, the structure (e.g. materials used for and layer(s) therein), geometry, and function of these components are analogous. For example, optical grating 318 may be formed of the same electro-optic materials as optical modulator/waveguide 313. FIG. 3A depicts a side view of electro-optic device 300 in the region of optical grating 318. Also shown in FIG. 3A are optical fiber 315 from which an optical signal (optical mode 319) is desired to be coupled via optical grating 318. Optical grating 318 may also be used to couple optical signals out to fiber 315. FIG. 3B depicts a cross-sectional view of electro-optic device 300 in the region of electrodes 317. For clarity, only some portions of electro-optic device 300 are shown. In some embodiments, electro-optic device 300 may include other and/or additional components.

FIG. 3A depicts an embodiment in which buried back reflector 311 is formed in back-end processing. Buried back reflector 311 is patterned on top of a substrate 310 that already has a bottom cladding layer 312. For example, buried back reflector 311 may be pre-patterned on top of cladding 312 that resides on substrate 310. Additional cladding layer 312A may then then deposited on top of the buried back reflector 311 before planarization of layer 312A and bonding of the electro-optical material used for electro-optic component 313 and/or optical grating 318. This results in a geometry in which the buried back reflector 311 is suspended within the cladding layer (312 and 312A). Different materials composition can be used for the bottom cladding layer 312. FIG. 3B depicts electro-optic device 300 in the region of electrodes 317. Electrodes 317 do not have buried back reflector underneath them, resulting in little to no change in the transmission line properties. Thus, buried back reflector 311 may be located with respect to the positions of electrodes 317 in an analogous manner to buried back reflector(s) 111 and 211. The cladding layer 312 underneath the buried back reflector layer 311 can be used to fine tune the properties (such as RF index, loss, and impedance) of the transmission line for efficient electro-optic modulation. In addition, the distance between a top surface of buried back reflector 311 and a bottom surface of optical grating 318 is separately tailored from a thickness of buried back reflector 311.

Electro-optic device 300 may share the benefits of electro-optic device(s) 100 and/or 200. Use of buried back reflector 311 may increase coupling efficiency of optical grating 318 to an out-of-plane optical mode. Because of the configuration of the buried back reflector 311, operation of electrodes 317 may not be compromised. Further, the optical and microwave performance may be separately optimized. Thus, the optical and microwave performance of electro-optic device 300 may be improved.

Figure 4A:
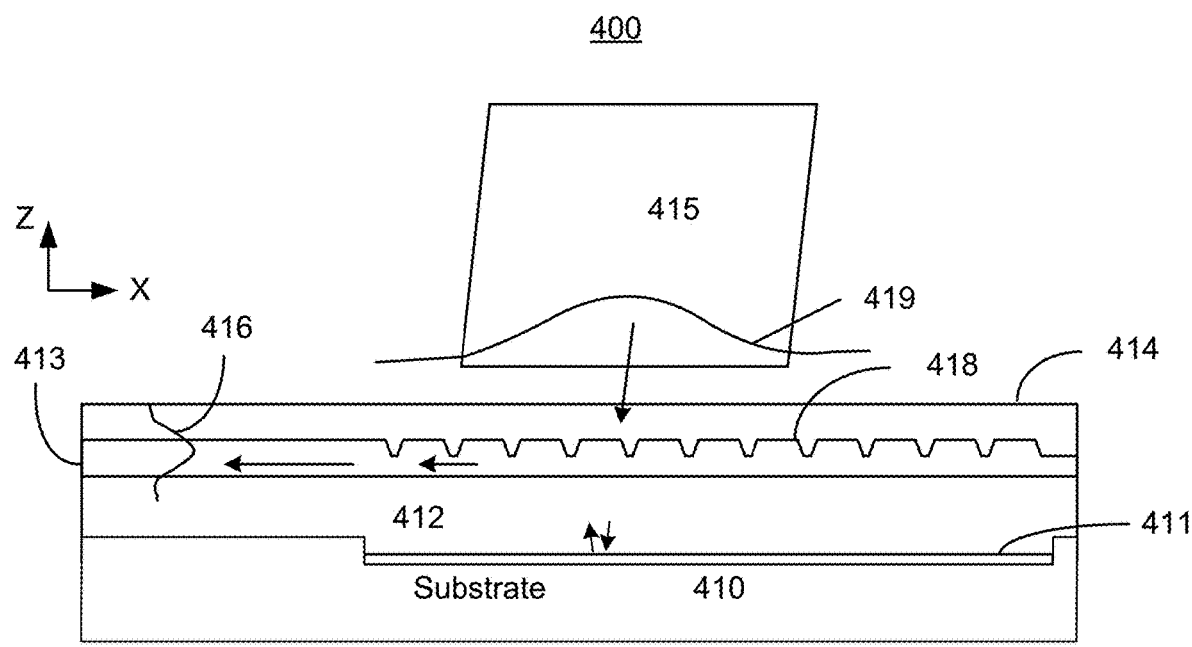
FIGS. 4A-4B are diagrams illustrating an embodiment of an electro-optic device using a buried back reflector.
Figure 4B:
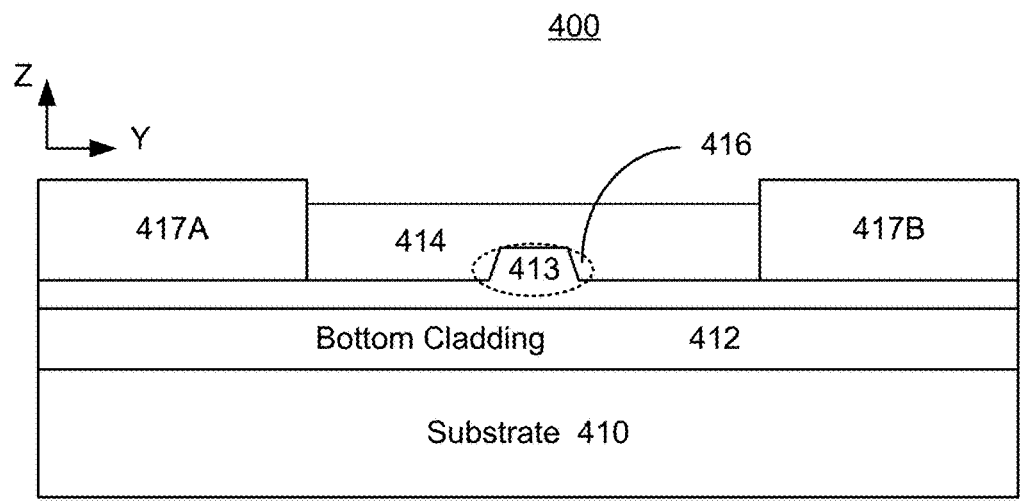

FIGS. 4A-4B are diagrams illustrating an embodiment of electro-optic device 400 using a buried back reflector. FIGS. 4A-4B are not to scale. Electro-optic device 400 is analogous to electro-optic device(s) 100, 200 and/or 300. Thus, electro-optic device 400 includes substrate 410, buried back reflector 411, bottom cladding 412, electro-optic component 413 including a slab and a ridge, top cladding 414, electrodes 417A and 417B (collectively or generically 417) and optical grating 418 that are analogous to substrate 110, 210 and/or 310, buried back reflector 111, 211 and/or 311, bottom cladding 112, 212 and/or 312/312A, electro-optic component 113 including slab 113A and ridge 113B, 213 and/or 313, top cladding 114, 214 and/or 314, electrodes 117, 217 and/or 317, and optical grating 118, 218 and/or 318, respectively. Consequently, the structure (e.g. materials used for and layer(s) therein), geometry, and function of these components are analogous. For example, optical grating 418 may be formed of the same electro-optic materials as optical modulator/waveguide 413. FIG. 4A depicts a side view of electro-optic device 400 in the region of optical grating 418. Also shown in FIG. 4A are optical fiber 415 from which an optical signal (optical mode 419) is desired to be coupled via optical grating 418. Optical grating 418 may also be used to couple optical signals out to fiber 415. FIG. 4B depicts a cross-sectional view of electro-optic device 400 in the region of electrodes 417. For clarity, only some portions of electro-optic device 400 are shown. In some embodiments, electro-optic device 400 may include other and/or additional components.

FIG. 4A depicts a device in which buried back reflector 411 is formed in back-end processing. Substrate 410 is etched to form trenches where buried back reflector 411 may be formed (e.g. via deposition). Buried back reflector 411 may or may not fill the trench formed. Different thicknesses for cladding 412 for the grating couplers and for the transmission line (e.g. electrodes 417) are shown in FIG. 4B. Thus, independent optimization of grating couplers and the transmission line may be achieved. Electro-optic device 400 may share the benefits of electro-optic device(s) 100, 200 and/or 300. Use of buried back reflector 411 may increase coupling efficiency of optical grating 418 to an out-of-plane optical mode. Because of the configuration of the buried back reflector 411, operation of electrodes 417 may not be compromised. Further, the optical and microwave performance may be separately optimized. Moreover, the thickness of buried back reflector 411 may be separately tailored from the distance to the bottom surface of optical grating 418 and from the thickness of cladding 412 between substrate 410 and components 417 and 413. This permits independent optimization of electrodes 417 and optical grating coupler 418. Thus, the optical and microwave performance of electro-optic device 400 may be improved.

Figure 5A:
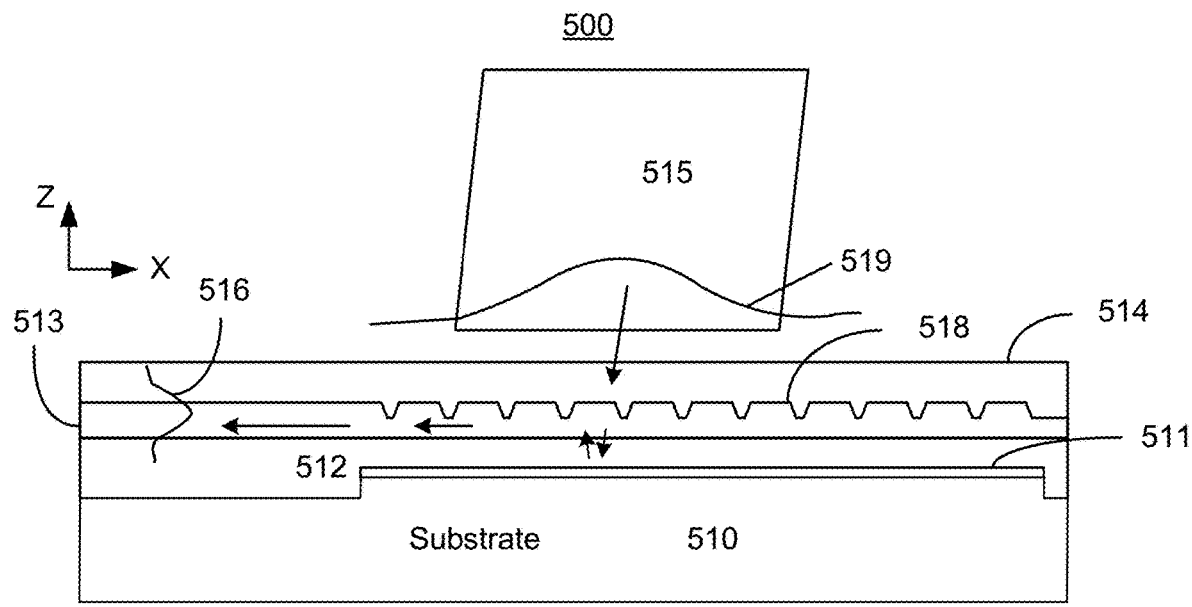
FIGS. 5A-5B are diagrams illustrating an embodiment of an electro-optic device using a buried back reflector.
Figure 5B:
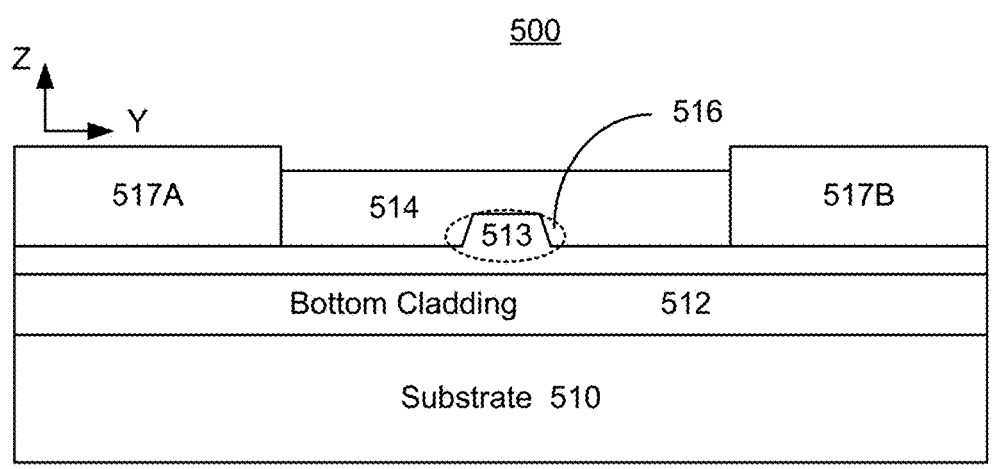

FIGS. 5A-5B are diagrams illustrating an embodiment of electro-optic device 500 using a buried back reflector. FIGS. 5A-5B are not to scale. Electro-optic device 500 is analogous to electro-optic device(s) 100, 200, 300 and/or 400. Thus, electro-optic device 500 includes substrate 510, buried back reflector 511, bottom cladding 512, electro-optic component 513 including a slab and a ridge, top cladding 514, electrodes 517A and 517B (collectively or generically 517) and optical grating 518 that are analogous to substrate 110, 210, 310 and/or 410, buried back reflector 111, 211, 311 and/or 411, bottom cladding 112, 212,312/312A, and/or 412, electro-optic component 113 including slab 113A and ridge 113B, 213, 313 and/or 413, top cladding 114, 214, 314 and/or 414, electrodes 117, 217, 317 and/or 417, and optical grating 118, 218, 318 and/or 418, respectively. Consequently, the structure (e.g. materials used for and layer(s) therein), geometry, and function of these components are analogous. For example, optical grating 518 may be formed of the same electro-optic materials as optical modulator/waveguide 513. FIG. 5A depicts a side view of electro-optic device 500 in the region of optical grating 518. Also shown in FIG. 5A are optical fiber 515 from which an optical signal (optical mode 519) is desired to be coupled via optical grating 518. Optical grating 518 may also be used to couple optical signals out to fiber 515. FIG. 5B depicts a cross-sectional view of electro-optic device 500 in the region of electrodes 517. For clarity, only some portions of electro-optic device 500 are shown. In some embodiments, electro-optic device 500 may include other and/or additional components.

FIG. 5A depicts a device in which buried back reflector 511 is formed in back-end processing. Substrate 510 is etched in areas without buried back reflector 511. This allows for different thicknesses of cladding 512 for optical grating coupler 518 and for the transmission line (e.g. electrodes 517) as shown in FIG. 5B. Thus, optical grating couplers 518 and the transmission line 517 may be independently optimized.

Electro-optic device 500 may share the benefits of electro-optic device(s) 100, 200, 300, and/or 400. Use of buried back reflector 511 may increase coupling efficiency of optical grating 518 to an out-of-plane optical mode. Because of the configuration of the buried back reflector 511, operation of electrodes 517 may not be compromised. Further, the optical and microwave performance may be separately optimized. For example, electrodes 517 and optical grating coupler 518 may be separately optimized. Thus, the optical and microwave performance of electro-optic device 500 may be improved.

Figure 6A:
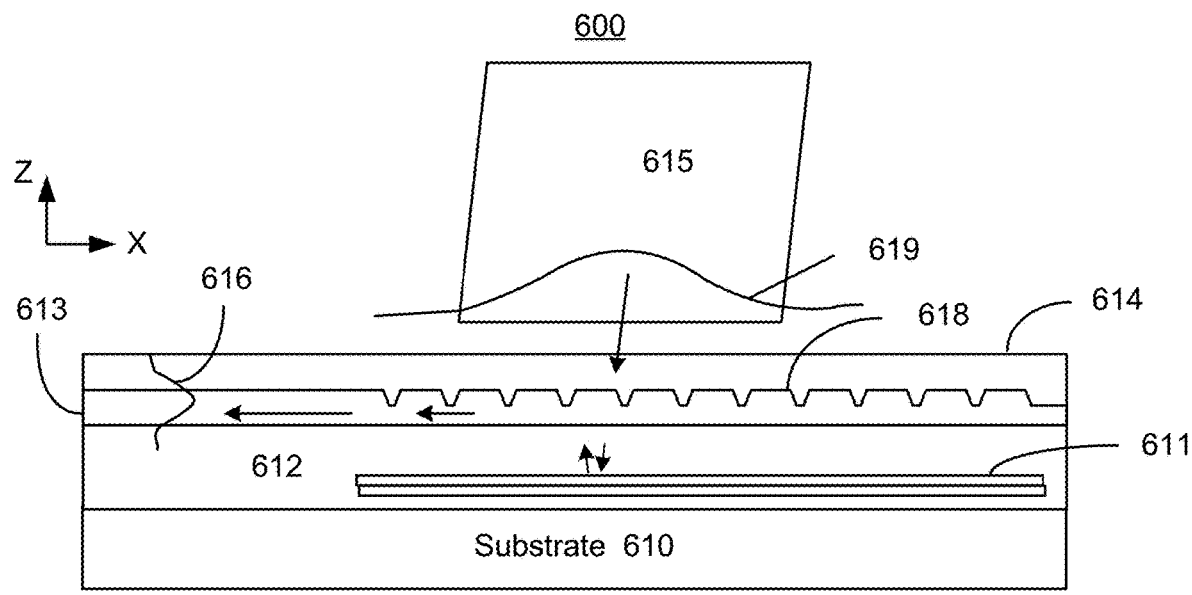
FIGS. 6A-6B are diagrams illustrating an embodiment of an electro-optic device using a buried back reflector.
Figure 6B:
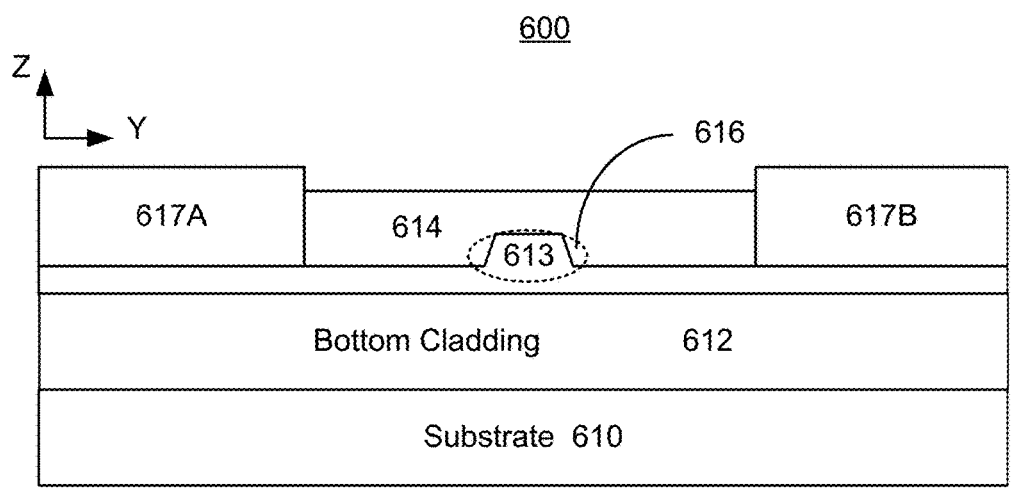

FIGS. 6A-6B are diagrams illustrating an embodiment of electro-optic device 600 using a buried back reflector. FIGS. 6A-6B are not to scale. Electro-optic device 600 is analogous to electro-optic device(s) 100, 200, 300, 400 and/or 500. Thus, electro-optic device 600 includes substrate 610, buried back reflector 611, bottom cladding 612, electro-optic component 613 including a slab and a ridge, top cladding 614, electrodes 617A and 617B (collectively or generically 617) and optical grating 618 that are analogous to substrate 110, 210, 310, 410 and/or 510, buried back reflector 111, 211, 311, 411 and/or 511, bottom cladding 112, 212,312/312A, 412, and/or 512, electro-optic component 113 including slab 113A and ridge 113B, 213, 313, 413 and/or 513, top cladding 114, 214, 314, 414 and/or 514, electrodes 117, 217, 317, 417 and/or 517, and optical grating 118, 218, 318, 418, and/or 518, respectively. Consequently, the structure (e.g. materials used for and layer(s) therein), geometry, and function of these components are analogous. For example, optical grating 618 may be formed of the same electro-optic materials as optical modulator/waveguide 613. FIG. 6A depicts a side view of electro-optic device 600 in the region of optical grating 618. Also shown in FIG. 6A are optical fiber 615 from which an optical signal (optical mode 619) is desired to be coupled via optical grating 618. Optical grating 618 may also be used to couple optical signals out to fiber 615. FIG. 6B depicts a cross-sectional view of electro-optic device 600 in the region of electrodes 617. For clarity, only some portions of electro-optic device 600 are shown. In some embodiments, electro-optic device 600 may include other and/or additional components.

FIG. 6A depicts electro-optic device 600 in which buried back reflector 611 may include multiple layers (e.g. multiple metal layers). For example, adhesion layer(s) such as Ti and/or a reflective layer such as gold may be included in buried back reflector 611. In some embodiments, the metal layers may be stacked directly on top of each other. Other designs with some vertical separation between the metal layers are also possible.

Electro-optic device 600 may share the benefits of electro-optic device(s) 100, 200, 300, 400, and/or 500. Use of buried back reflector 611 may increase coupling efficiency of optical grating 618 to an out-of-plane optical mode. Because of the configuration of the buried back reflector 611, operation of electrodes 617 may not be compromised. Further, the optical and microwave performance may be separately optimized. Thus, the optical and microwave performance of electro-optic device 600 may be improved.

Figure 7A:
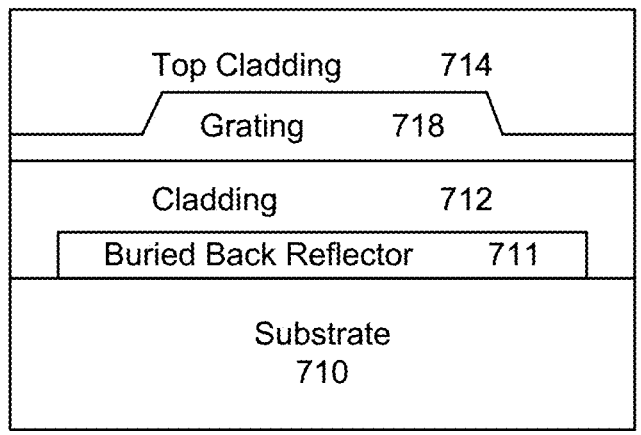
FIGS. 7A-7B are diagrams illustrating an embodiment of an electro-optic device using a buried back reflector.
Figure 7B:
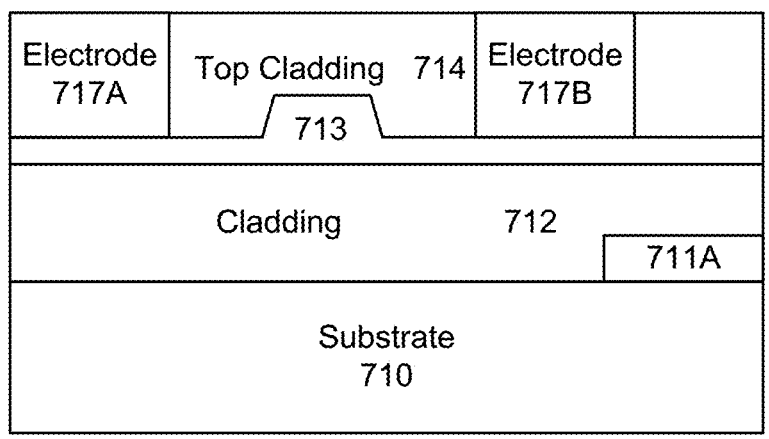

FIGS. 7A-7B are diagrams illustrating an embodiment of electro-optic device 700 using a buried back reflector. FIGS. 7A-7B are not to scale. Electro-optic device 700 is analogous to electro-optic device(s) 100, 200, 300, 400, 500 and/or 600. Thus, electro-optic device 700 includes substrate 710, buried back reflector 711, bottom cladding 712, electro-optic component 713 including a slab and a ridge, top cladding 714, electrodes 717A and 717B (collectively or generically 717) and optical grating 718 that are analogous to substrate 110, 210, 310, 410, 510 and/or 610, buried back reflector 111, 211, 311, 411, 511 and/or 611, bottom cladding 112, 212,312/312A, 412, 512, and/or 612, electro-optic component 113 including slab 113A and ridge 113B, 213, 313, 413, 513 and/or 613, top cladding 114, 214, 314, 414, 514 and/or 614, electrodes 117, 217, 317, 417, 517, and/or 617, and optical grating 118, 218, 318, 418, 518 and/or 618, respectively. Consequently, the structure (e.g. materials used for and layer(s) therein), geometry, and function of these components are analogous. For example, optical grating 718 may be formed of the same electro-optic materials as optical modulator/waveguide 713. FIG. 7A depicts a side view of electro-optic device 700 in the region of optical grating 718. FIG. 7B depicts a cross-sectional view of electro-optic device 700 in the region of electrodes 717. For clarity, only some portions of electro-optic device 700 are shown. In some embodiments, electro-optic device 700 may include other and/or additional components.

Also shown in FIG. 7B is a portion of another buried back reflector 711A. For example, buried back reflector 711A may be for another component not shown in FIGS. 7A-7B or may be a pre-patterned buried back reflector that was not used in electro-optic device 700. Although there is some small overlap between buried back reflector 711A and electrode 717B, this is insufficient to significantly affect performance of electrodes 717

Electro-optic device 700 may share the benefits of electro-optic device(s) 100, 200, 300, 400, 500, and/or 600. Use of buried back reflector 711 may increase coupling efficiency of optical grating 718 to an out-of-plane optical mode. Because of the configuration of the buried back reflector 711, operation of electrodes 717 may not be compromised. Further, the optical and microwave performance may be separately optimized. Thus, the optical and microwave performance of electro-optic device 700 may be improved.

Figure 8:
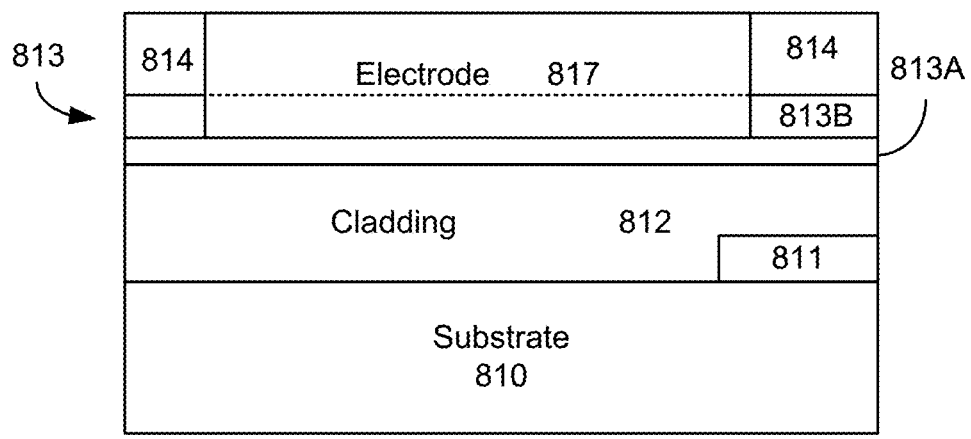
FIG. 8 depicts an embodiment of an electro-optic device using a buried back reflector.

FIG. 8 is a diagram illustrating an embodiment of electro-optic device 800 using a buried back reflector. FIG. 8 is not to scale. Electro-optic device 800 is analogous to electro-optic device(s) 100, 200, 300, 400, 500, 600 and/or 700. Thus, electro-optic device 800 includes substrate 810, buried back reflector 811, bottom cladding 812, electro-optic component 813 including a slab 813A and a ridge 813B, top cladding 814, electrodes 817 (of which only one is shown) and optical grating (not shown) that are analogous to substrate 110, 210, 310, 410, 510, 610 and/or 710, buried back reflector 111, 211, 311, 411, 511, 611 and/or 711, bottom cladding 112, 212,312/312A, 412, 512, 612 and/or 712, electro-optic component 113 including slab 113A and ridge 113B, 213, 313, 413, 513, 613 and/or 713, top cladding 114, 214, 314, 414, 514, 614 and/or 714, electrodes 117, 217, 317, 417, 517, 617, and/or 717, and optical grating 118, 218, 318, 418, 518, 618, and/or 718, respectively. Consequently, the structure (e.g. materials used for and layer(s) therein), geometry, and function of these components are analogous. For clarity, only some portions of electro-optic device 800 are shown. In some embodiments, electro-optic device 800 may include other and/or additional components.

Buried back reflector 811 may be for another component not shown in FIG. 8, may be for an optical grating (not shown), or may be a pre-patterned buried back reflector that was not used in electro-optic device 800. Although there is some small overlap between buried back reflector 811 and electrode 817, this is insufficient to significantly affect performance of electrodes 817.

Electro-optic device 800 may share the benefits of electro-optic device(s) 100, 200, 300, 400, 500, 600, and/or 700. Use of buried back reflector 811 may increase coupling efficiency of the optical grating or other component with which it is used. Because of the configuration of the buried back reflector 811, operation of electrodes 817 may not be compromised. Further, the optical and microwave performance may be separately optimized. Thus, the optical and microwave performance of electro-optic device 800 may be improved.

Figure 9:
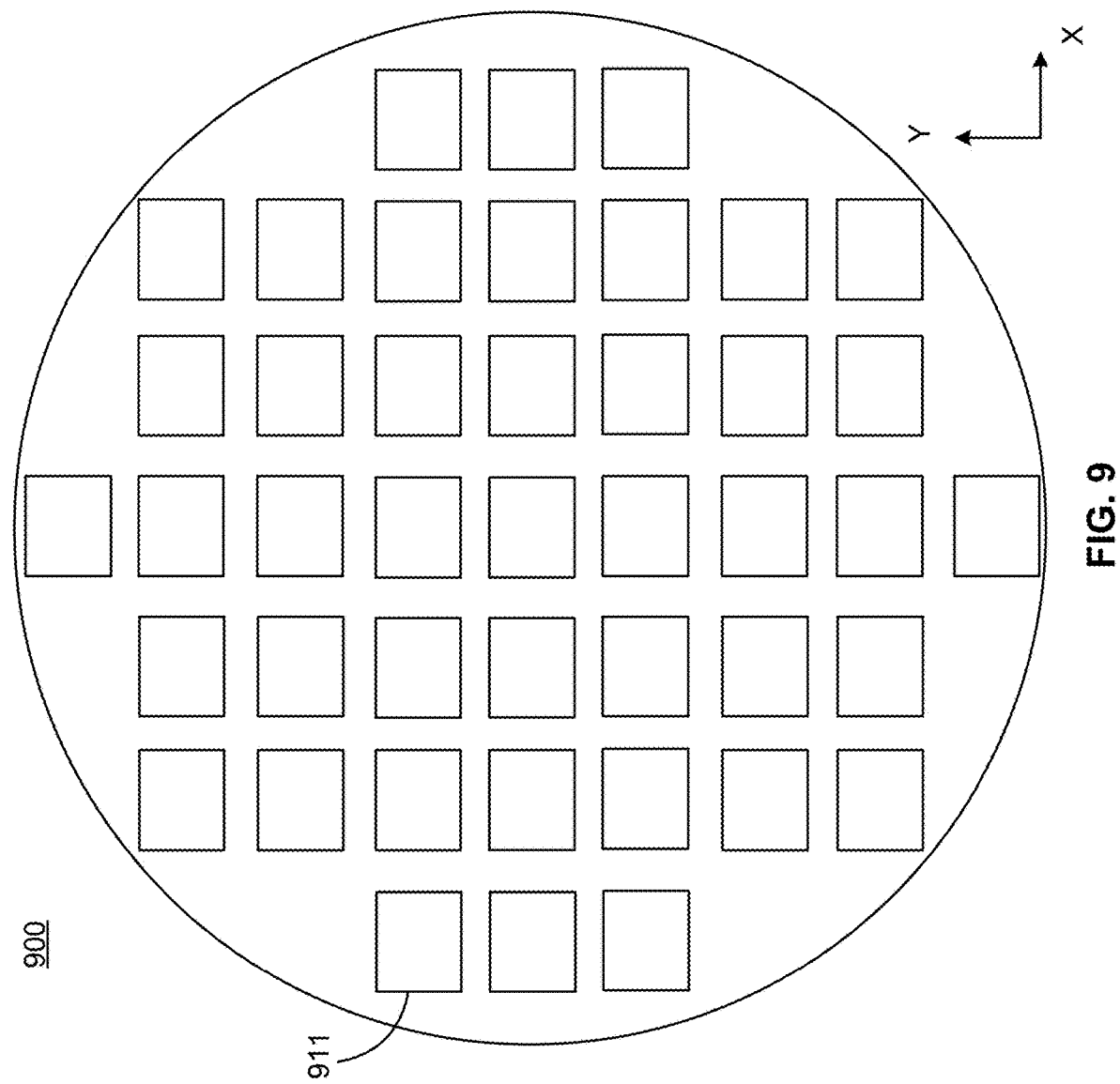
FIGS. 9-12 depict embodiments of various configurations of wafers including buried back reflectors.
Figure 10:
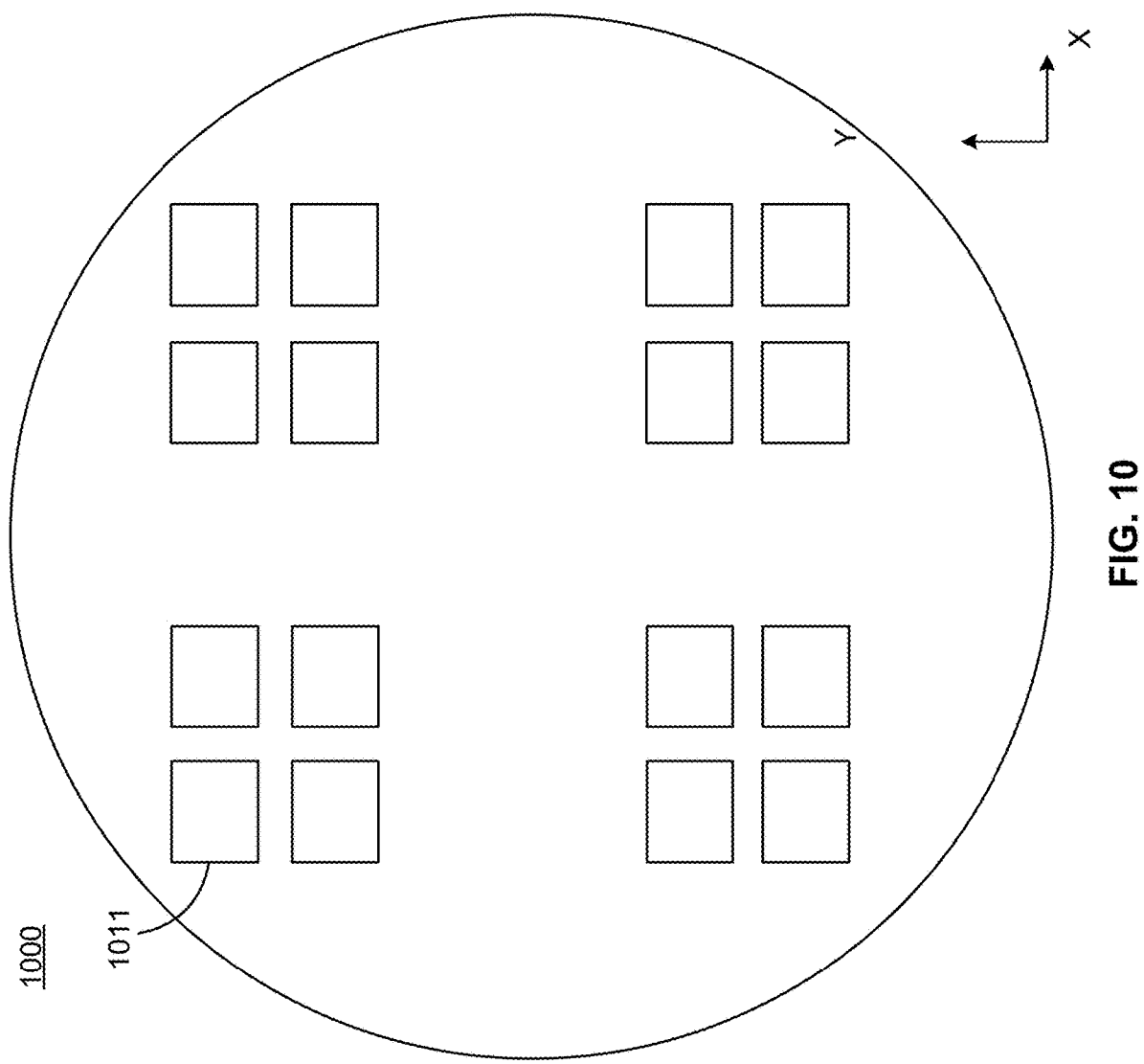
Figure 11:
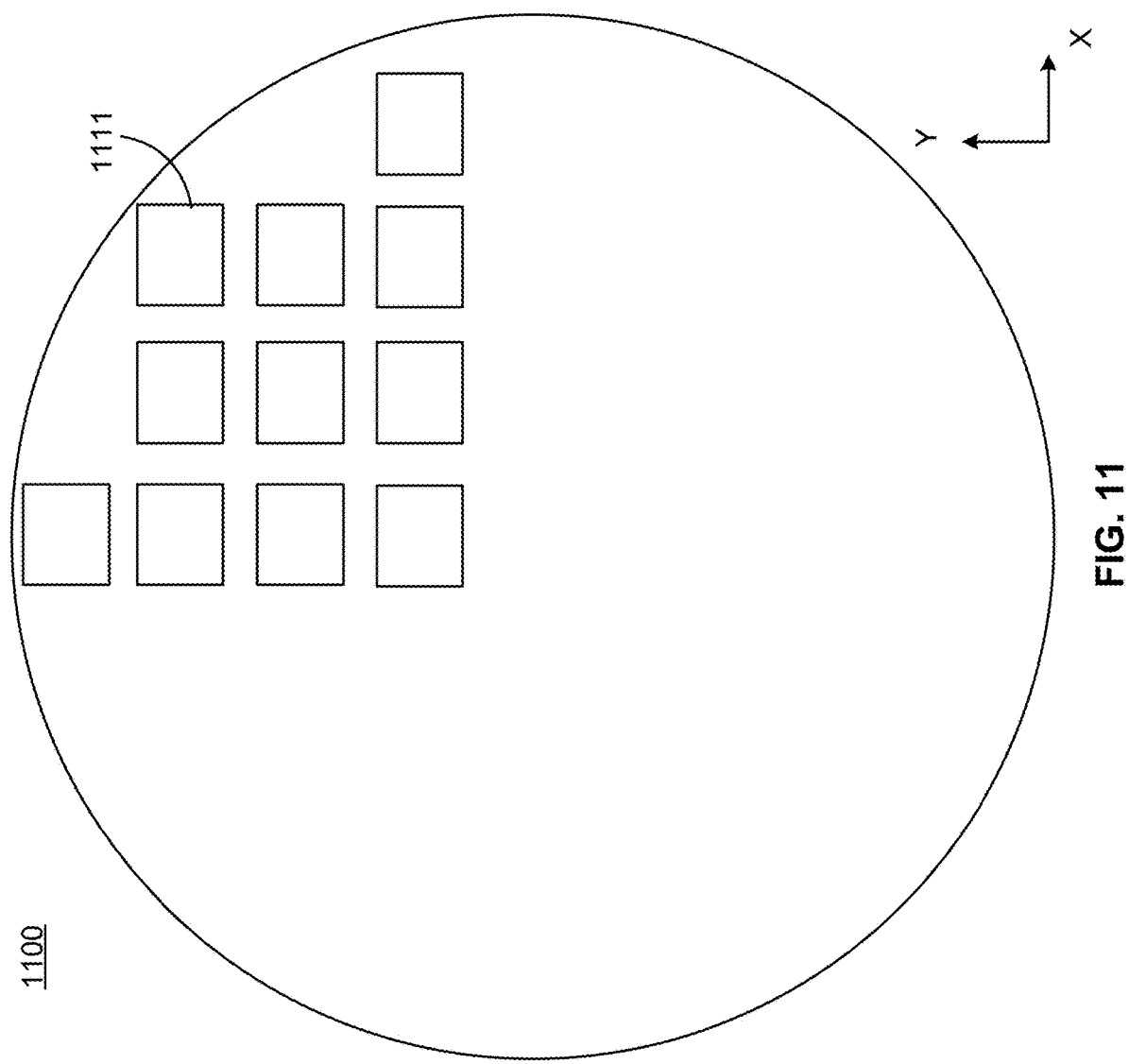
Figure 12:
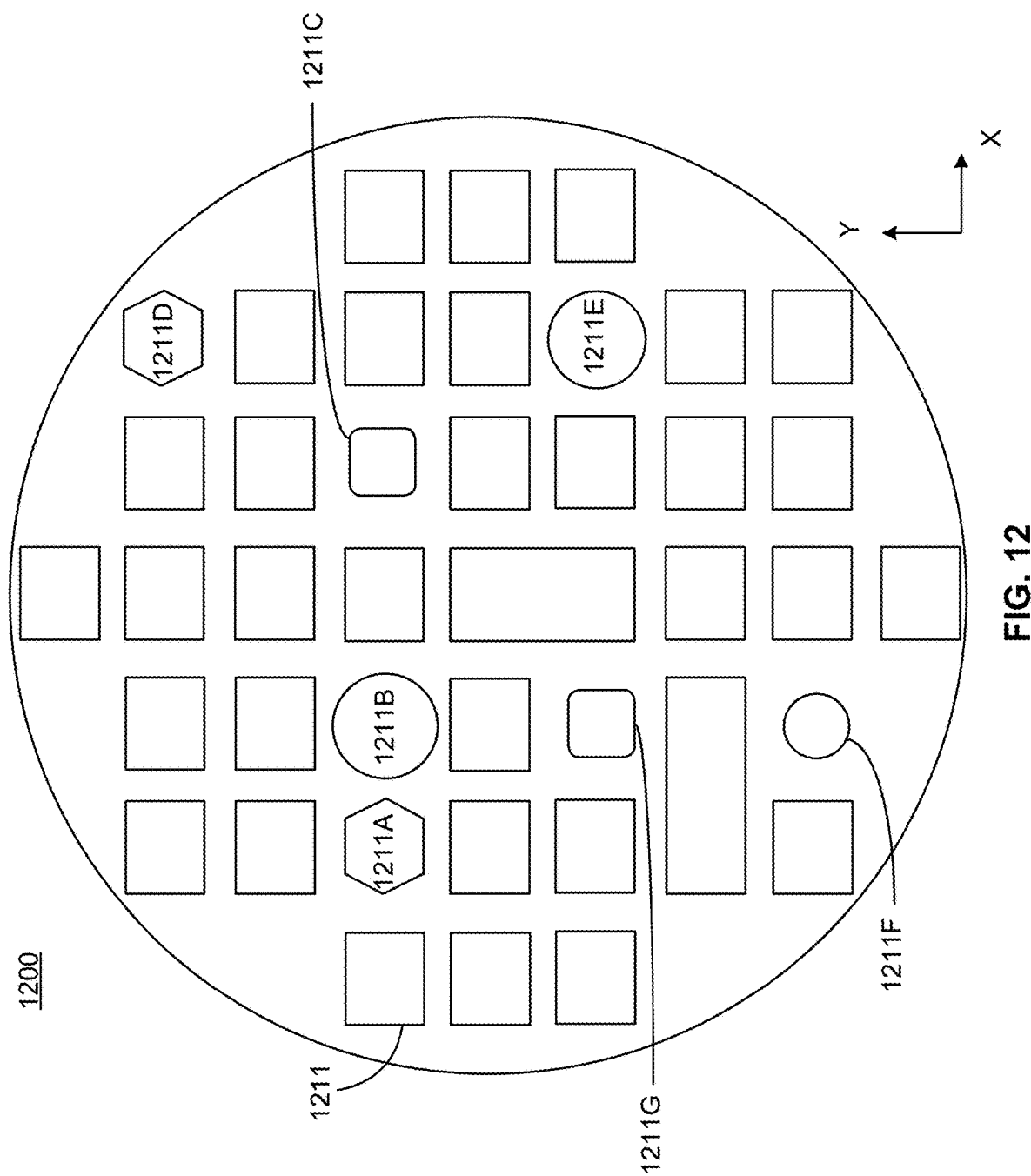

FIGS. 9, 10, 11, and 12 depict embodiments of various configurations of wafers 900, 1000, 1100, and 1200, respectively, including buried back reflectors. Although certain configurations are shown in FIGS. 9-12, other configurations may be used. FIG. 9 depicts wafer 900 including buried back reflectors 911, of which only one is labeled. FIG. 9 is not to scale. For the embodiment depicted in FIG. 9, buried back reflectors 911 maybe patterned uniformly across wafer 900. FIG. 10 depicts wafer 1000 including buried back reflectors 1011, of which only one is labeled. FIG. 10 is not to scale. In the embodiment depicted in FIG. 10, buried back reflectors 1011 maybe be patterned sparsely across wafer 1000. FIG. 11 depicts wafer 1100 including buried back reflectors 1111, of which only one is labeled. FIG. 11 is not to scale. In the embodiment of FIG. 11, buried back reflectors 1111 may be patterned only on certain sections of the wafer. FIG. 12 depicts wafer 1000 including buried back reflectors 1211, of which only one is labeled, as well as buried back reflectors 1211A, 1211B, 1211C, 1211D, 1211E, and 1211F. FIG. 12 is not to scale. In the embodiment depicted in FIG. 12, buried back reflectors 1211, 1211A, 1211B, 1211C, 1211D, 1211E, 1211F, and 1211G maybe may have different sizes and/or shapes, such as rectangular, circular, polygonal, square or any other arbitrary shape.

Electro-optic devices formed on wafers 900, 1000, 1100, and/or 1200 may share the benefits of electro-optic devices 100, 200, 300, 400, 500, 600, 700, and/or 800. Thus, optical coupling may be improved without adversely affecting performance of electrodes.

Figure 13C:
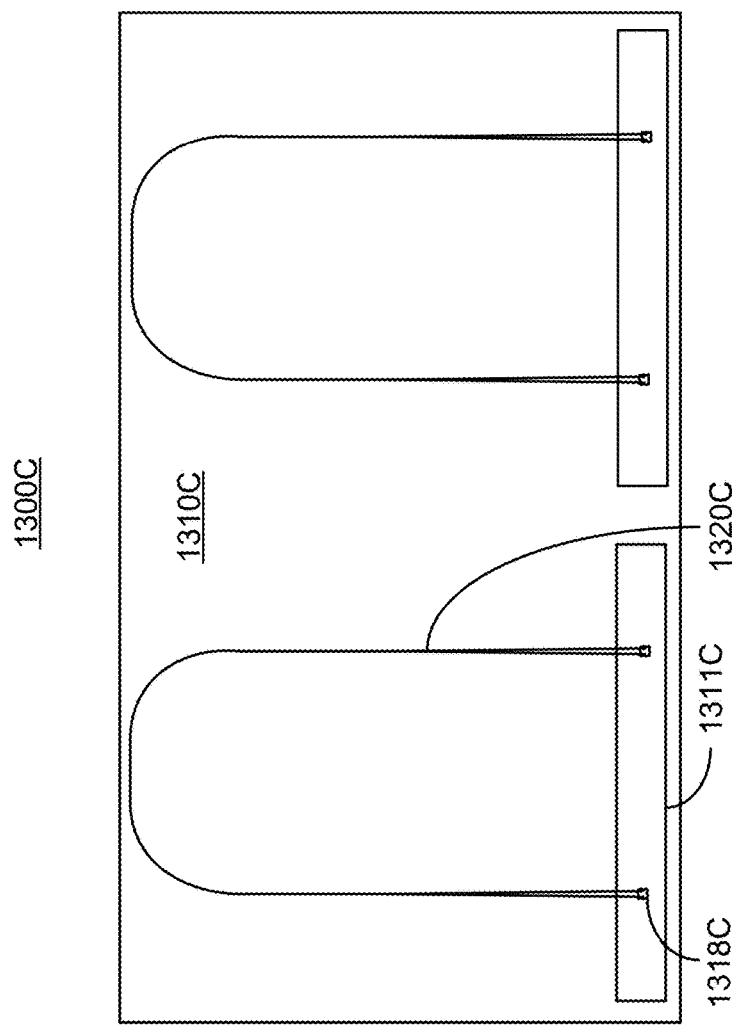
FIGS. 13A-13C depict embodiments of electro-optic devices including buried back reflectors.
Figure 13A:
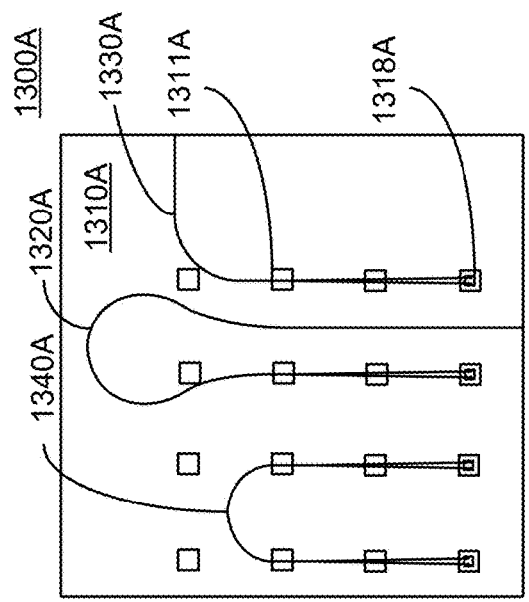
Figure 13B:
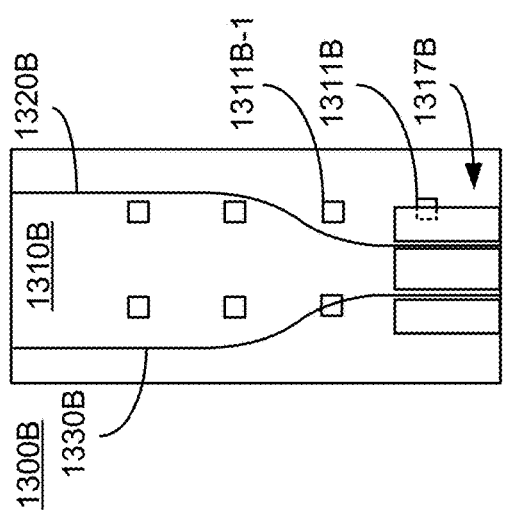

FIGS. 13A-13C depict embodiments of electro-optic devices 1300A, 1300B, and 1300C including buried back reflectors. FIGS. 13A-13C are not to scale. Although certain configurations are shown in FIGS. 13A-13C, other configurations may be used. FIG. 13A depicts electro-optic device 1300A including substrate 1310A, sixteen buried back reflectors 1311A (of which only one is labeled), four optical gratings 1318A (of which only one is labeled) and waveguides 1320A, 1330A, and 1340A. FIG. 13B depicts electro-optic device 1300B including substrate 1310B, electrodes 1317B, unused buried back reflector 1311B that extends slightly under electrodes 1317, unused buried back reflectors 1311B-1 (of which only one is labeled), and waveguides 1320B and 1330B. FIG. 13C depicts electro-optic device 1300C including substrate 1310C, two buried back reflectors 1311C (of which only one is labeled), and two waveguides 1320A (of which only one is labeled). Thus, various configurations of used and unused buried back reflectors may be present. However, electro-optic devices 1300A, 1300B, and 1300C are configured such that buried back reflectors 1311A, 1311B, 1311B-1, and 1311C do not compromise the performance of corresponding electrodes. Thus, electro-optic devices 1300A, 1300B, and 1300C may share the benefits of electro-optic devices 100, 200, 300, 400, 500, 600, 700, and/or 800.

The embodiments described herein include any geometry/other geometries that correspond to the embodiment described herein. This includes variations on implementation details. Other embodiments are briefly described below. Any combination and permutations of the variations, including incorporating portions of the embodiments described herein are possible. Thus, the embodiments described herein are for explanatory purposes and are not intended to unduly limit the configuration of the back reflector and/or optical device.

Figure 14:
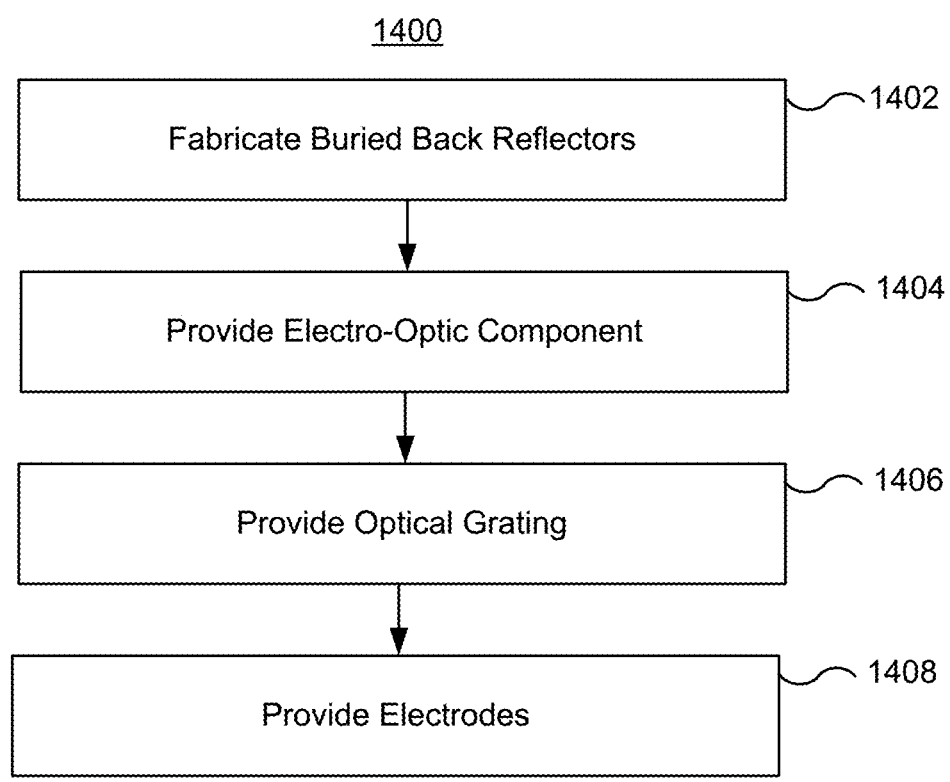
FIG. 14 is a flow chart depicting an embodiment of a method for fabricating an electro-optic device including buried back reflectors.

FIG. 14 is a flow chart depicting an embodiment of method 1400 for fabricating an electro-optic device including buried back reflectors. For simplicity, only some steps are shown. Other and/or additional processes may be used. Further, one or more steps of method 1400 may include multiple substeps. Method 1400 is also described in the context of forming a single electro-optic device. However, multiple devices may be formed in parallel.

A buried back reflector is provided, at 1402. In some embodiments, the buried back reflector is fabricated as part of front end processing. For example, the buried back reflector may be provided directly on the surface the substrate for the electro-optic device being formed. In some embodiments, the size, shape, and locations of the buried back reflectors are standardized. In some embodiments, 1402 includes depositing one or more layers (e.g. adhesion and reflective metal layer(s)) for the buried back reflector over the surface of the wafer. Portions of the layer(s) are then removed such that the buried back reflectors remain. Thus, the layer(s) may then be patterned as part of 1402 to form the buried back reflector having the desired size, shape, location and/or other properties. In some embodiments, a portion of substrate is removed at 1402 to form a trench therein. In such embodiments, 1402 includes forming the buried back reflector in the trench. The buried back reflector may (or may not) fill the trench. In some embodiments, 1402 includes removing portions of the substrate to form pedestals (i.e. raised portions of the substrate). In such embodiments, 1402 includes forming the buried back reflector on the pedestal. In some embodiments, other structures are formed prior to providing the buried back reflector. For example, 1402 may include forming a layer of cladding and/or other material(s). In such embodiments, the buried back reflector is formed above the substrate. For example, 1402 may include providing the buried back reflector on the cladding and/or other materials.

An electro-optic component is fabricated, at 1504. In addition, an optical grating is provided, at 1506. In some embodiments, 1504 and 1506 may occur together. For example, a bottom cladding layer that covers the buried back reflector may be provided as part of 1504 and/or 1506. This may include depositing and planarizing the bottom cladding layer. One or more electro-optic materials are provided on the bottom cladding layer. At 1504 and 1506, the electro-optic material(s) are patterned in one or more processes such that both the electro-optic component and the optical grating are formed substantially in parallel.

The electrodes are provided, at 1408. In some embodiments, 1408 includes depositing a top cladding layer. Further, the metal and/or other layer(s) for the electrodes may be deposited and patterned.

For example, electro-optic device 200 may be fabricated using method 1400. Back reflector 211 is provided, at 1402. In some embodiments, 1402 may be performed in front-end processing. If other devices, such as electro-optic device(s) 300, 400, and/or 500 were formed, additional structures may be provided before or as part of 1402. For example, a trench or pedestal may be formed in substrate 210 or a portion of bottom cladding 212 may be provided before buried back reflector 211 is formed. Embodiments of some such devices are depicted in FIGS. 3A-3B, 4A-4B, 5A-5B, and 6A-6B.

Electro-optic component 213 (i.e. waveguide 213) and optical grating 218 and/or 218A are provided at 1404 and

1406. For example, bottom cladding 212 may be provided and electro-optic material(s) such as LN and/or LT bonded to bottom cladding 212. In some embodiments, thin film electro-optic materials are used. At 1404 and 1406, the electro-optic materials are lithographically fabricated to form waveguide 213 and optical grating(s) 218 and/or 218A. Electrodes 217 are formed at 1408. In some embodiments, this includes providing top cladding 214 as well as electrodes 217. Thus, using method 1400 an electro-optic device having improved optical coupling and reduced impact to electrode performance.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing an optical device, comprising:
   providing a plurality of electrodes;
   providing an electro-optic component including at least one optical material exhibiting an electro-optic effect;
   providing an optical grating optically coupled with the electro-optic component; and
   providing a buried back reflector optically coupled with the optical grating, the buried back reflector configured to increase a coupling efficiency of the optical grating to an out-of-plane optical mode;
   wherein the buried back reflector is configured to reduce a performance perturbation to the plurality of electrodes.

2. The method of claim 1, wherein the providing the buried back reflector further includes:
   providing an adhesion layer; and
   providing a metal layer on the adhesion layer, the metal layer having a thickness of at least thirty nanometers and not more than five hundred nanometers.

3. The method of claim 1, wherein the optical device is fabricated on a substrate, the electro-optic component, the optical grating and the buried back reflector residing on the substrate, a portion of the substrate aligned with the optical grating, the portion of the substrate being continuous.

4. The method of claim 1, wherein a distance between a top surface of the buried back reflector and a bottom surface of the optical grating is separately tailored from a thickness of the buried back reflector.

5. The method of claim 1, a portion of the electro-optic component being between the plurality of electrodes, the buried back reflector being offset from the portion of the electro-optic component.

6. The method of claim 1, wherein the buried back reflector is offset from the plurality of electrodes.

* * * * *